(12) United States Patent
Kuramoto

(10) Patent No.: US 7,161,681 B2
(45) Date of Patent: Jan. 9, 2007

(54) ABERRATION MEASURING APPARATUS COMPRISING WAVELENGTH CALIBRATION AND STABILIZATION

(75) Inventor: Yoshiyuki Kuramoto, Tochigi (JP)

(73) Assignee: Canon Kabushiki Kaisha, Tokyo (JP)

(*) Notice: Subject to any disclaimer, the term of this patent is extended or adjusted under 35 U.S.C. 154(b) by 325 days.

(21) Appl. No.: 10/794,728

(22) Filed: Mar. 4, 2004

(65) Prior Publication Data

US 2004/0174535 A1 Sep. 9, 2004

(30) Foreign Application Priority Data

Mar. 7, 2003 (JP) .............................. 2003-061072

(51) Int. Cl.
*G01B 11/02* (2006.01)
(52) U.S. Cl. ..................................... 356/515
(58) Field of Classification Search ................ 356/515, 356/124; 355/53; 378/36
See application file for complete search history.

(56) References Cited

U.S. PATENT DOCUMENTS

| 4,823,354 | A | * | 4/1989 | Znotins et al. | ................. | 372/57 |
| 6,633,364 | B1 | * | 10/2003 | Hayashi | ........................ | 355/53 |
| 6,774,982 | B1 | * | 8/2004 | Ouchi | ......................... | 355/67 |
| 2002/0057495 | A1 | | 5/2002 | Kuramoto | ..................... | 359/618 |

* cited by examiner

*Primary Examiner*—Hwa (Andrew) Lee
*Assistant Examiner*—Marissa J. Detschel
(74) *Attorney, Agent, or Firm*—Morgan & Finnegan, LLP

(57) ABSTRACT

It is an exemplary object of the present invention to provide an aberration measuring apparatus capable of measuring wavefront aberration of an optical system to be analyzed at a high degree of accuracy for a long time. In order to attain this object, the aberration measuring apparatus of the present invention comprises a light source which emits light having a near-infrared wavelength, a wavelength transformer which transforms light from the light source to light having substantially the same wavelength as the wavelength used and an interferometer which causes the light from the wavelength transformer to enter the optical system to be analyzed and measures aberration of the optical system to be analyzed.

4 Claims, 18 Drawing Sheets

US 7,161,681 B2

ABERRATION MEASURING APPARATUS COMPRISING WAVELENGTH CALIBRATION AND STABILIZATION

BACKGROUND OF THE INVENTION

1. Field of the Invention

The present invention generally relates to an aberration measuring apparatus of an optical system, and more particularly, to an aberration measuring apparatus which measures wavefront aberration of a projection optical system of a photolithography apparatus which transfers a pattern on a mask to a photosensitive substrate. Such a photolithography apparatus is used, for example, in a lithography step when a semiconductor device is manufactured.

2. Related Background Art

When a micro semiconductor device such as a semiconductor memory or logic circuit is manufactured using a photolithography (printing) technology, a projection photolithography apparatus is conventionally used which transfers a circuit pattern drawn on a mask or reticle (these are used as mutually interchangeable terms in the present application) by projecting it onto a wafer, etc., through a projection optical system.

A minimum transferable size (resolution) through a projection photolithography apparatus is proportional to the wavelength of light used for exposure and inversely proportional to the numerical aperture (NA) of a projection optical system. Therefore, the resolution increases as the wavelength is shortened. For this reason, in response to a growing demand for miniaturization of semiconductor devices in recent years, light of shorter and shorter wavelengths is used for exposure light sources such as an ultra-high pressure mercury lamp (i-line) (wavelength: approximately 365 nm), KrF excimer laser (wavelength: approximately 248 nm) and ArF excimer laser (wavelength: approximately 193 nm). In the future, an $F_2$ laser (wavelength: approximately 157 nm) and EUV light (Extreme Ultra Violet) (wavelength: approximately 13 nm) are seen as promising alternatives.

The projection photolithography apparatus is required to accurately transfer a pattern on a mask to a wafer at a predetermined magnification ratio (reduction ratio) and in order to meet such a demand, it is important to use a projection optical system with excellent image formation performance with aberration reduced to a minimum. With reference to FIG. 13 to FIG. 15, the measuring principles for measuring wavefront aberration of the optical system used for wavelengths of 193 nm or below will be explained. FIG. 13 is a schematic block diagram showing an example of a conventional aberration measuring apparatus 1000.

The aberration measuring apparatus 1000 uses an excimer laser 1100 as the light source for an interferometer as in the case of an exposure light source of an optical system PO (projection optical system) to be analyzed. However, the excimer laser 1100 has an intensity pattern which is an oblong rectangular pattern to narrow the spectral band of emitted light beams and has low spatial coherence for reasons related to the structure of a resonator, and therefore the excimer laser 1100 alone is not adequate as the light source for an interferometer. Therefore, a wavefront shaping unit 1110 for shaping wavefront of light emitted from the excimer laser 1100 is provided to alleviate these conditions.

The wavefront shaping unit 1110 is constructed of a toric optical system for transforming a rectangular pattern into a square pattern, a lens for condensing the light beam transformed into the square pattern, a lens for restoring the spread light beams after condensing to parallel light beams and a spatial filter placed close to such a condensing point.

"The light beam whose intensity pattern has been shaped by the wavefront shaping unit 1110 and whose spatial coherence has been improved is branched into two optical paths by a half mirror 1200. The light beam which has passed through the half mirror 1200 passes through an objective lens 1210 and an optical system PO to be analyzed and is reflected by a spherical mirror 1220. The point of image formation of the optical system PO matches the curvature center of the spherical mirror 1220. For this reason, the light beam reflected by the spherical mirror 1220 propagates on the same optical path in the reverse direction, is reflected by the half mirror 1200, passes through a first pupil image formation lens 1310 and a second pupil image formation lens 1320 and enters a CCD camera 1400 as light to be analyzed."

On the other hand, the optical path of the light beam reflected by the half mirror 1200 is turned up by a turnup mirror 1510, the light beam is then reflected by a reference mirror 1520, returns on the same optical path and passes through the half mirror 1200. The light beam which has passed through the half mirror 1200 is introduced into the CCD camera 1400 as reference light by the first pupil image formation lens 1310 and second pupil image formation lens 1320.

Through interference between these two light beams (that is, the light to be analyzed and the reference light), an interference pattern is detected by the CCD camera 1400. To calculate wavefront aberration of the optical system PO to be analyzed from the detected interference pattern, a so-called pattern scanning method is used. This method calculates an initial phase of the interference pattern from a plurality of interference pattern images when a length of optical path difference between the light to be analyzed and the reference light is scanned. Such a length of optical path difference is scanned by synchronizing the reference mirror 1520 with the CCD camera 1400 by a control section 1600.

Here, when the wavefront aberration of the optical system PO to be analyzed is measured, it is necessary to control the wavelength of the light source during measurement. This is because the optical system PO to be analyzed includes chromatic aberration, and thus the measurement result varies depending on the wavelength of the light source during measurement. Therefore, the control section 1600 acquires the wavelength at the time of measurement from a wavelength measuring mechanism 1120 provided in the excimer laser 1100. The wavelength measuring mechanism 1120 is calibrated by an etalon, etc., and the measuring accuracy of its absolute value is guaranteed by calibrating it using an absorption line such as platinum. Furthermore, when the light source is an $F_2$ laser, it is normally not provided with the wavelength measuring mechanism 1120 and therefore calculated values or values measured using a spectroscope, etc., are used.

Furthermore, as shown in FIG. 14, by replacing the objective lens 1210 with a TS (Transmit Sphere) lens 1710 and replacing the spherical mirror 1220 with an RS (Reflective Sphere) mirror 1720, it is possible to use the light beam reflected by a final plane (that is, TS plane) 1710a of the TS lens 1710 as reference light.

The principle of the aberration measuring apparatus using an excimer laser light source has been described so far. However, when an excimer laser is used as a light source for an interferometer of an aberration measuring apparatus used to measure wavefront aberration of a projection optical system for a wavelength of 193 nm or less for which no excellent continuous wave light source exists as the light source for an interferometer, the projection optical system contains a chromatic aberration, and the same light source as that for the photolithography apparatus is used through the aberration measuring apparatus used must measure wavelengths with high accuracy, and therefore the measuring accuracy of wavelengths is not sufficient. Moreover, since its coherence length is short, it is actually very difficult to construct an interferometer which requires a length of optical path difference represented by a Fizeau interferometer as shown in FIG. 14.

Furthermore, when an excimer laser is used as the light source for an interferometer, its spatial coherence, time coherence and directional stability are insufficient, and therefore if a spatial filter for improving the spatial coherence is placed, the stability of beam amount after passing through the spatial filter deteriorates due to low directional stability and the measuring accuracy of wavefront deteriorates. Furthermore, a thick spectral line width which causes low time coherence provokes overlapping of interference patterns by different wavefronts due to chromatic aberration of the optical system to be analyzed, and therefore the contrast deteriorates and it is difficult to realize high accuracy measurement. Moreover, the low time coherence is sensitively reflected in a reduction of contrast due to a deviation in the length of the optical length path difference, and therefore the arrangement of the optical system needs to be changed when measuring wavefront errors caused by a system which is indispensable for high accuracy measurement of an optical system to be analyzed, that is, measurement of system errors, and exact measurement of a system error is impossible.

Furthermore, there is also a problem that the contrast of interference patterns decreases due to a decrease in transmittance of the optical system PO to be analyzed caused by shortening of wavelengths for photolithography apparatuses in recent years. The decrease in the contrast of interference patterns increases measurement errors of wavefront aberration due to disturbance such as variations in a beam amount of laser from the light source.

FIG. 15 is a graph showing a variation in the contrast of interference patterns due to transmittance of the optical system PO to be analyzed. A dashed line indicates an interference pattern when the transmittance of the optical system PO to be analyzed is 100% and the contrast at this time is 100%. On the other hand, a solid line indicates an. interference pattern when the transmittance of the optical system PO to be analyzed is 50% on one way. Since the beam amount of the reference light is equal to that of the light to be analyzed, the contrast of interference pattern deteriorates to approximately 80%.

Furthermore, when both the TS lens and RS mirror have a low reflective index, the beam amount of the light source necessary for the CCD camera to obtain an appropriate beam amount increases. That is, it is not possible to use a light source which is unable to obtain a sufficient beam amount output as the interferometer, and attempting to obtain a sufficient beam amount causes an enormous load on the light source and a pulse light source using-wavelength transformation deteriorates long-term maintainability of the light source such as deterioration of crystals and optical devices, etc.

SUMMARY OF THE INVENTION

Thus, it is an exemplary object of the present invention to provide an aberration measuring apparatus capable of measuring wavefront aberration of an optical system to be analyzed at a high degree of accuracy for a long time.

In order to attain this object, the aberration measuring apparatus of the present invention comprises a light source which emits light having a near-infrared wavelength, a wavelength transformer which transforms light from the light source to light having substantially the same wavelength as the wavelength used and an interferometer which causes the light from the wavelength transformer to enter the optical system to be analyzed and measures aberration of the optical system to be analyzed.

The other objects and features of the invention will become more apparent from the following detailed description of a preferred embodiment of the invention with reference to the drawings.

DESCRIPTION OF THE PREFERRED EMBODIMENTS

Figure 1:
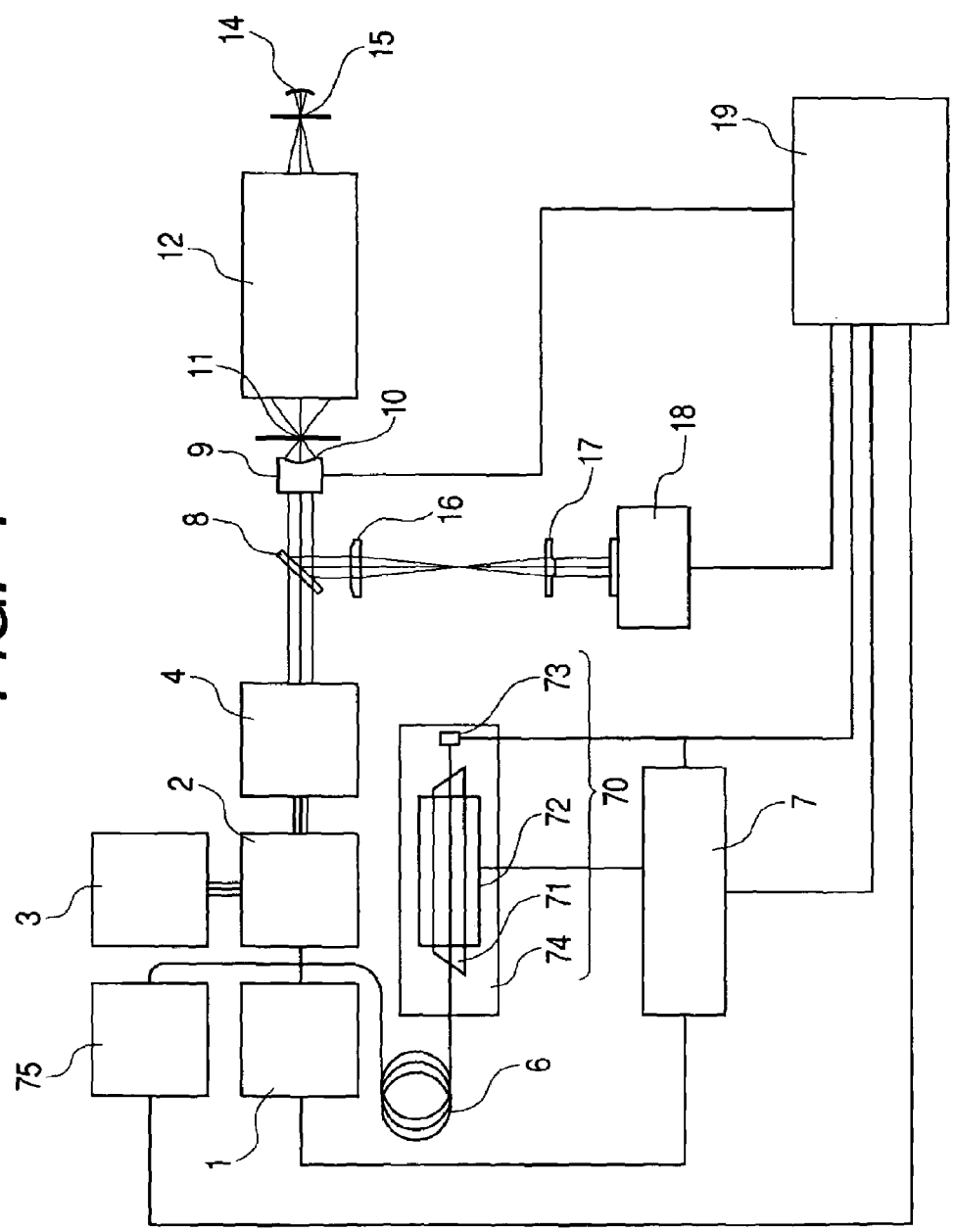
FIG. 1 is a schematic block diagram of an aberration measuring apparatus showing a first embodiment of the present invention.

With reference now to the attached drawings, an aberration measuring apparatus as one aspect of the present invention will be explained in detail below. The same members in the respective drawings are attached the same reference numerals and overlapping explanations will be omitted. Here, FIG. 1 is a schematic block diagram of an aberration measuring apparatus showing a first embodiment of the present invention.

The light source of the aberration measuring apparatus is constructed of four units indicated by reference numerals 1 to 4 in FIG. 1. To obtain a light source with high time coherence, a continuous wave light source in a single longitudinal mode having a near-infrared wavelength is used for an implantation light source 1. As the laser medium in an oscillator 2, titanium sapphire crystal, etc., is used. Furthermore, to excite a laser medium in the oscillator 2, an excitation light source 3 having a wavelength in the absorption band of the laser medium is used. The titanium sapphire crystal has an absorption band close to 500 nm, and therefore double wave of infrared light such as Nd:YAG or Nd:YLF using Nd trivalent ions is used as the excitation light source 3. Since the peak output of the oscillator 3 needs to be increased to improve the efficiency of subsequent wavelength transformation, a pulse light source whose peak output is increased using a Q switch, etc., is used for the excitation light source 3, too.

Through the excitation light source 3 and implantation light source 1, pulse light with high peak output of a near-infrared wavelength and high coherence is output from the oscillator 2. To obtain high spatial coherence, the oscillator 2 is designed so as to oscillate in a single lateral mode. The output pulse from the oscillator 2 is guided to a wavelength transformation unit 4, where the output pulse is subjected to a plurality of stages of wavelength transformation using a nonlinear optical effect of a crystal and then pulse light having the same wavelength as the exposure wavelength of the optical system to be analyzed 12 is output.

When the optical system to be analyzed 12 is a projection lens for an ArF excimer laser, the output light is 193 nm and the wavelength of the implantation light source 1 is set to four times the central wavelength of the exposure laser. At this time, the wavelength transformation unit 4 is designed so as to output pulse light having a wavelength ¼ of the wavelength of the incident infrared light.

Furthermore, when the optical system to be analyzed 12 is a projection lens for an $F_2$ excimer laser, the output light is 157 nm and the wavelength of the implantation light source 1 is set to five times the central wavelength of the exposure laser. At this time, the wavelength transformation unit 4 outputs pulse light having a wavelength ⅕ of the wavelength of the incident infrared light.

The central wavelength is set by carrying out wavelength control on the implantation light source 1 based on the wavelength value measured by a wave meter 75 which is calibrated to a high degree of accuracy by a wavelength calibration mechanism which will be described later.

For the wave meter 75, a so-called fringe scan type wave meter is used which branches the incident light into two beams, provides a length of optical path difference between the two light beams, counts light and shade of an interference pattern detected when the length of optical path difference is scanned and thereby carries out measurement. The wavelength measured value obtained has sufficient accuracy of 0.1 pm or below with regard to reproducibility. Then, the wave meter 75 calibrates wavelengths using an iodine absorption cell 70.

The iodine absorption cell 70 consists of a gas cell 71 in which iodine is implanted, a heater 72 for adjusting the temperature of the gas cell 71 and a photoreceptor 73 for converting the beam amount after passing through the gas cell 71 to an electric signal. In this embodiment, the wavelength of the output light from the wavelength transformation unit 4 is 193 nm and that from the implantation light source 1 is 772 nm, four times. Observing absorption of iodine with the wavelength of the implantation light source 1 requires the gas cell 71 to be set to a high temperature of 500° C. or more and this temperature is controlled by a control section 7. To prevent influences of heat generated by the heater 72 on the interferometer, the gas cell 71 is placed in a thermostatic chamber 74 and incidence upon the iodine absorption cell 70 is carried out by a fiber 6 and the iodine absorption cell 70 is thereby placed in a place physically distant from the interferometer.

Here, the method of calibrating wavelengths using the iodine absorption cell 70 will be explained. A transmitted beam amount signal of the gas cell 71 obtained at the photoreceptor 73 is observable through A/D by a control computer 19. Furthermore, the control computer 19 is also connected to the implantation light source 1 at the same time and the wave meter 75 can acquire a wave meter measured value and the wavelength of the implantation light source 1 is controllable. Hereinafter, wavelength control refers to relatively rough control over wavelengths by driving a wavelength selection device such as a diffraction grating provided on the implantation light source 1 using an actuator such as a PZT.

First, according to a command from the control computer 19, the wavelength of the implantation light source 1 is set to a shortest wavelength or a longest wavelength in a calibration wavelength band. At this time, suppose the gas cell 71 is kept to a sufficiently stable temperature by the control section 7 issuing a command for temperature setting of the heater 72 beforehand.

The control section 7 issues a command for scanning the output wavelength up to the end of the calibration wavelength band to the implantation light source 1. Together with the scanning of the wavelength, the control section 7 acquires a measured value of the wave meter 75 and the control computer 19 acquires the transmitted beam amount of the gas cell 71.

Wavelength scanning may be performed in stages in such a way that scanning is temporarily stopped after the wavelength is changed by a certain amount and measurement by the wave meter 75 is carried out and these operations are repeated or may be linear scanning whereby measured values of the wave meter 75 are acquired every time when a wavelength is changed linearly. In the case of linear scanning, it is necessary to synchronize the wavelength measured value with data of the transmitted beam amount in consideration of the time required for measurement of the wave meter 75.

This embodiment assumes that the wavelength area to be scanned is 773.2 nm to 773.6 nm. This is because, when transformed to a ¼ wavelength by the wavelength transformation unit 4, the wavelength area corresponds to a wavelength of 193.3 nm to 193.4 nm (because the optical system to be analyzed is a projection lens for an ArF excimer laser). When the optical system to be analyzed is a projection lens for an $F_2$ excimer laser, assuming that 788.0 nm to 788.25 nm is a wavelength area to be scanned by the wave meter 75, the wavelength area corresponds to a wavelength of 157.60 nm to 157.65 nm when transformed to a ⅕ wavelength by the wavelength transformation unit.

Figure 2:
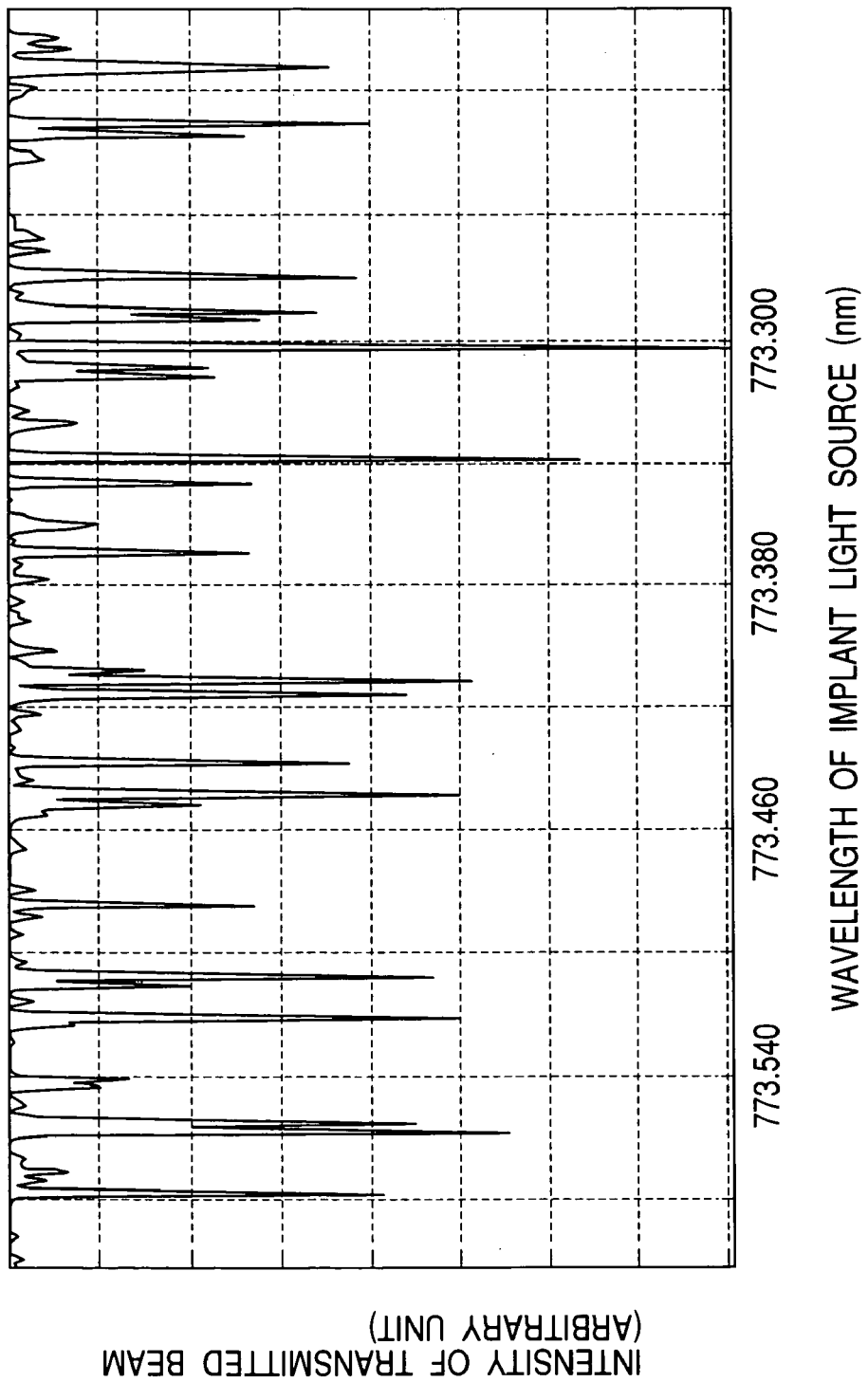
FIG. 2 is a graph showing a case where an absorption line of the measuring apparatus shown in FIG. 1 is of iodine having a wavelength approximately 4 times 193 nm.
Figure 3:
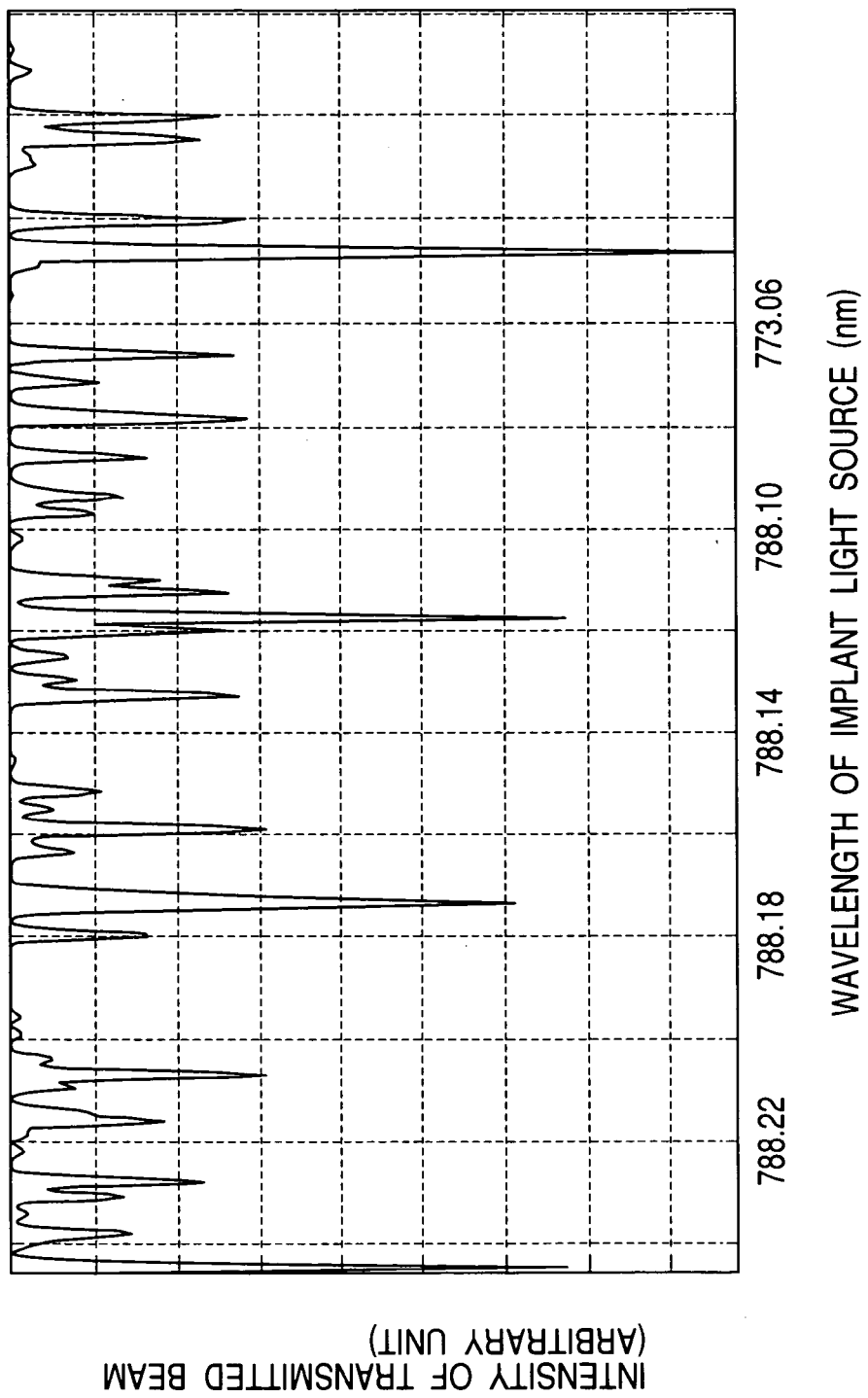
FIG. 3 is a graph showing a case where an absorption line of the measuring apparatus shown in FIG. 1 is of iodine having a wavelength approximately 5 times 157 nm.

Here, FIG. 2 is a graph showing an absorption structure of iodine from 773.2 nm to 773.6 nm. FIG. 3 is a graph showing an absorption structure of iodine from 788.0 nm to 788.25 nm.

Here, the wavelength of the light emitted from the implantation light source 1 is preferably near-infrared light, specifically 700 nm to 1000 nm or more preferably within a range of 750 nm to 800 nm. Furthermore, it is preferably an integer multiple of the exposure wavelength or within ±1 nm of an integer multiple of the exposure wavelength and the integer multiple is preferably 4 to 5 times.

By comparing the measured value of the wave meter 75 acquired by the above described method with the transmitted beam amount signal and the iodine absorption structures in FIG. 2 and FIG. 3, the absolute wavelength of a plurality of absorption lines appearing in the transmitted beam amount signal is identified. By comparing the measured values of the wave meter 75 at the position of this identified absorption line, it is possible to move the wavelength of the implantation light source 1 to the vicinity of an arbitrary absorption line whose absolute wavelength is guaranteed.

Then, the wave meter 75 will be calibrated at a high degree of accuracy. An absorption line to be calibrated is selected from the iodine absorption structure in FIG. 2, the difference between the measured value of the wave meter 75 and wavelength value of the absorption line in FIG. 2 obtained using the above described method is added and wavelength control in the vicinity of the absorption line is thereby carried out on the implantation light source 1 by the control computer 19.

After the wavelength control is completed, micro wavelength control on the implantation light source 1 is carried out. Here, micro wavelength control refers to high accuracy wavelength control compared to wavelength control which can be done by changing an implantation current into a semiconductor device which is a laser medium of the implantation light source 1. Hereinafter, micro wavelength control will be referred to as "light frequency control."

More specifically, as a dither signal to be fixed to the absorption line, the wavelength of the implantation light source 1 is vibrated using a sine wave with an amplitude substantially equivalent to the line width of the absorption line through light frequency control. For this sine wave vibration, an output from a high accuracy oscillator provided in the control section 7 is used. The control section 7 is also provided with an addition circuit for adding an offset voltage to the sine wave vibration output.

Figure 4:
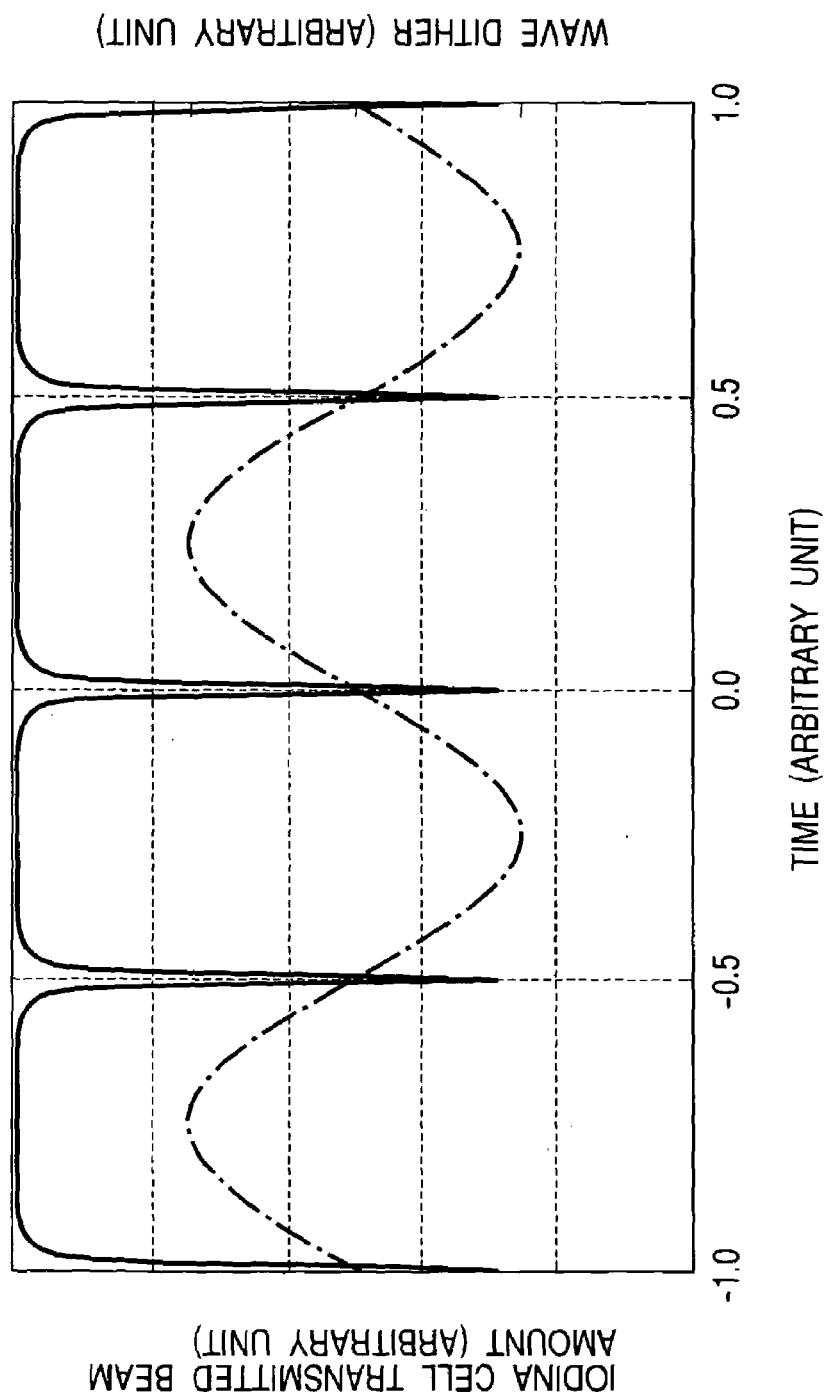
FIG. 4 is a graph showing a transmitted beam amount when the wavelength of the measuring apparatus shown in FIG. 1 is dither-vibrated.

When the center of vibration completely matches the absorption line, the spectrum of the transmitted beam amount becomes only even-order components of the vibration frequency of the light frequency, but when the absorption line is deviated from the center of vibration of the light frequency, odd-order components of the vibration frequency are generated. According to FIG. 4, a solid line shows the transmitted beam amount and a dashed line shows vibration of the wavelength, indicating the case where the absorption line and vibration center completely match. Here, FIG. 4 is a graph showing the transmitted beam amount versus sine wave vibration. This embodiment performs frequency control over the implantation light source 1 so that the odd-order components become a minimum and thereby locks the wavelength of the implantation light source 1 and absorption line. To detect the odd-order components, it is possible to perform lock-in detection from the transmitted beam amount signal using the output of the oscillator as a reference signal.

The output obtained through the lock-in detection is integrated at an integration circuit having a desired time constant, then used for frequency control of the implantation light source 1 as a feedback signal, that is, as an offset voltage.

According to the above described method, it is possible to fix the wavelength of the implantation light source 1 to the wavelength of an absorption line. In this condition, a wavelength is measured using the wave meter 75. Since the wavelength of the implantation light source 1 can be fixed for a long time, averaging to improve the measurement accuracy is effective and more accurate wavelength measurement is possible.

Based on the wavelength measured value obtained, the output wavelength of the light source units 1 to 4 will be calculated. In this embodiment, it is possible to calculate the output wavelength by dividing the wavelength measured value of the calibrated near-infrared light by 4. This completes the calibration of the wavelength of one absorption line.

As shown in FIG. 2, since there are many absorption lines in the focused wavelength band, it is possible to select a plurality of absorption lines, carry out wavelength calibration on the respective absorption lines using the above described method, carry out a recursive analysis on the result thereof using straight lines or polynomials, etc., and thereby perform more accurate wavelength calibration. When the wavelength to be focused has a single fixed wavelength and matches the absorption line, calibration can be carried out only on a single absorption line.

The calibration result is saved in the control computer 19, the wavelength of the implantation light source 1 is controlled using the calibrated wavelength value with the calibration value added to the measured value of the wave meter 75 and the light source wavelength during wavefront measurement is guaranteed. Since measurement using the wave meter 75 is highly reproducible as described above, it is possible to control the wavelength of the light source with a sufficiently high degree of accuracy.

Hereinafter, a second embodiment of the present invention will be explained. While the first embodiment has described an example of wavelength calibration at the measuring apparatus, the second embodiment uses the technology of fixing an output wavelength obtained through a wavelength transformation by fixing the fundamental wavelength to an absorption line for stabilization of interference patterns.

Referring to FIG. 1 again, the second embodiment will be explained.

While the first embodiment has described an example of wavelength calibration at the wavefront shape measuring apparatus, the second embodiment uses the technology of fixing an output wavelength obtained through a wavelength transformation by fixing the fundamental wavelength to an absorption line for stabilization of interference patterns. As shown in FIG. 1, a beam emitted from light sources 1 to 4 passes through a half mirror 8 and enters a TS lens 9. A reflection prevention film at the wavelength of the light source is applied to all the planes of lenses other than a TS plane 10, no coating is normally applied to the TS plane 10 and surface reflection is used instead. When the output from the light source units 1 to 4 is insufficient or when the transmittance of an optical system to be analyzed 12 is low and the contrast of an interference pattern is reduced, it is also possible to apply reflective coating.

The light beam reflected by the TS plane 10 is reflected by the half mirror 8, passes through a first pupil image formation lens 16 and a second pupil image formation lens 17 and enters a camera 18. Hereinafter, this light beam will be referred to as a "reference beam."

On the other hand, the light beam which has passed through the TS plane 10 is condensed once, condensed on the image plane of the optical system to be analyzed 12 and then reflected by an RS mirror 14. For the RS mirror 14, no coating is normally applied and surface reflection is used, but as in the case of the TS plane 10, it is also possible to apply high reflection coating such as aluminum coating or create it from a light reflective member such as a Si crystal. The light beam reflected by the RS mirror 14 passes through the optical system to be analyzed 12 and TS lens 9 again, reflected by the half mirror 8 and enters the camera as in the case of the reference light beam. Hereinafter, this second light beam will be referred to as a "light beam to be analyzed." The camera 18 can obtain an interference pattern due to interference between the reference light beam and the light beam to be analyzed which have the same optical path.

In a so-called Fizeau interferometer made up of the TS plane 10 and RS mirror 14, a length of optical path difference between the optical path to be analyzed and the reference optical path is generated which doubles the length of optical path obtained by adding the focal distance of the TS lens 9 and the radius of curvature of the RS mirror 14 to the length of optical path of the optical system to be analyzed 12. This value is approximately 3 to 4 m in the case of measurement of a projection lens for a semiconductor photolithography apparatus. Constructing an interferometer with such a long length of optical path difference requires the light source to have a coherent length such that an interference pattern is generated in the above described length of optical path difference and frequency stability such that an interference pattern is stabilized in the above described length of optical path difference. Here, suppose the coherent length is equal to a pulse width at which the contrast of an interference pattern due to interference between two light beams of the same intensity reduces to 50%. Furthermore, the relationship between the frequency stability and phase of the interference pattern is expressed by the following Formula 1.

$$df = \frac{c}{L}\frac{d\phi}{2\pi}$$ [Formula 1]

where, df is frequency stability, c is the velocity of light, L is the length of optical path difference of the interferometer, dΦ is the phase of the interference pattern. The coherent length necessary for the light source in measurement of the projection lens for a semiconductor photolithography apparatus is 1 to 2 times or more than the length of optical path difference and the necessary frequency stability is several MHz.

The light source units 1 to 4 may satisfy the necessary coherent length but may not be sufficient with regard to frequency stability. In such a case, stabilization of the light frequency is performed separately.

When stabilization of the light frequency is performed, it is not possible to change the output wavelength for the above described reason, and therefore the method of fixing wavelengths is different from that in first embodiment.

The outputs from the light source 1 branched through a fiber pass through an electro-optical modulation device. The electro-optical modulation device is provided with a drive apparatus for giving an electro-optical effect at a desired frequency separately. Using the modulation frequency of the drive apparatus as the fundamental frequency, a small amount of frequency variation before and after the fundamental frequency is made possible. As is well known, the light beam after passing through the electro-optical modulation device generates a band wave which is expressed by the following Formula 2.

$$F(m) = F0 \pm mFeom$$ [Formula 2]

where F(m) is the light frequency of the mth-order band wave, F0 is the light frequency of the incident light beam, m is an integer order of a band wave and Feom is a modulation frequency. The modulation frequency Feom needs to satisfy the following Formula 3 from the condition under which only the +1st order band wave is absorbed by iodine.

$$Feom > 2\Delta f$$ [Formula 3]

where Δf is the line width of the absorption line.

Hereinafter, the band wave of higher order than the 2nd order will be considered to have a low beam amount itself, and therefore ignored. Furthermore, in order to add micro vibration for stabilization of the light frequency or so-called dithering, a dithering modulation is further added to the electro-optical modulation frequency Feom, and therefore the actual light frequency is expressed by the following Formula 4.

$$F(m) = F0 + mFeom(1 + \Delta Feom \times \text{Sin}(2\pi F\text{dither}))$$ [Formula 4]

where ΔFeom denotes a variation width of the electro-optical modulation frequency, Fdither denotes the frequency of wavelength dithering. That is, the wavelength of a band wave fluctuates at a dithering frequency Fdither having an amplitude of micro amount ΔFeom. These modulations are performed accurately using an oscillator provided for the controller 9.

The modulated light beam is allowed to pass through an iodine cell 70 as in the case of first embodiment. Since the beam amounts of the 0th-order and first order band waves which are not affected by the absorption line neither depend on the dithering nor fluctuate, the transmitted beam amount obtained varies at a point at which a certain amount of offset is added, but when the center of the frequency variation of the 1st order band wave completely matches the absorption line, the spectrum of the transmitted beam amount becomes only the even-order components of the vibration frequency and when the absorption line deviates from the vibration center of the light frequency, the point at which the odd-order components of the vibration frequency are generated is completely the same as that of first embodiment. The odd-order components can be detected by carrying out lock-in detection from the transmitted beam amount signal using the output of the dithering frequency oscillator as a reference signal. In this embodiment, the +1st order band wave of the implantation light source 1 is fixed to the absorption line by carrying out frequency control of the implantation light source 1 in such a way that this odd-order component reaches a minimum. This fixing is performed by integrating the output obtained through the lock-in detection at an integration circuit having a desired time constant and then applying the integration result to the implantation light source 1 as a feedback signal. The feedback signal for locking is applied to the implantation light source itself, and therefore the frequency of the implantation light source 1 can be stabilized consequently.

For the wavelength during measurement, it is possible to use the measured value of the wave meter 75 calibrated according to first embodiment or calculate the wavelength from the absorption line which locks the 1st order band wave and the electro-optical modulation frequency.

In this way, the frequency at the wavelength of the implantation light source is stabilized, and therefore the frequency of the output wavelength after wavelength transformation is also stabilized.

As a result of frequency stabilization, for a calculation of wavefront from a sufficiently stabilized interference pattern, it is possible to use a so-called pattern scanning method which calculates the phase from a plurality of interference patterns when the TS lens 9 or RS mirror 14 is scanned. In this embodiment, the TS lens 9 is provided on a high accuracy actuator and the pattern scanning method is carried out by acquiring the interference pattern when this actuator is driven by a command from a control computer 19 through the camera 18. When the measuring accuracy of the wavefront shape needs to be improved, it is possible to perform scanning a plurality of times and average the interference pattern intensity. This averaging of interference pattern intensity takes more measurement time, but it is possible to guarantee the stability of the interference pattern within the measurement time by adjusting the time constant of the integrator of the feedback signal to approximately the same degree of the measurement time beforehand.

Figure 5:
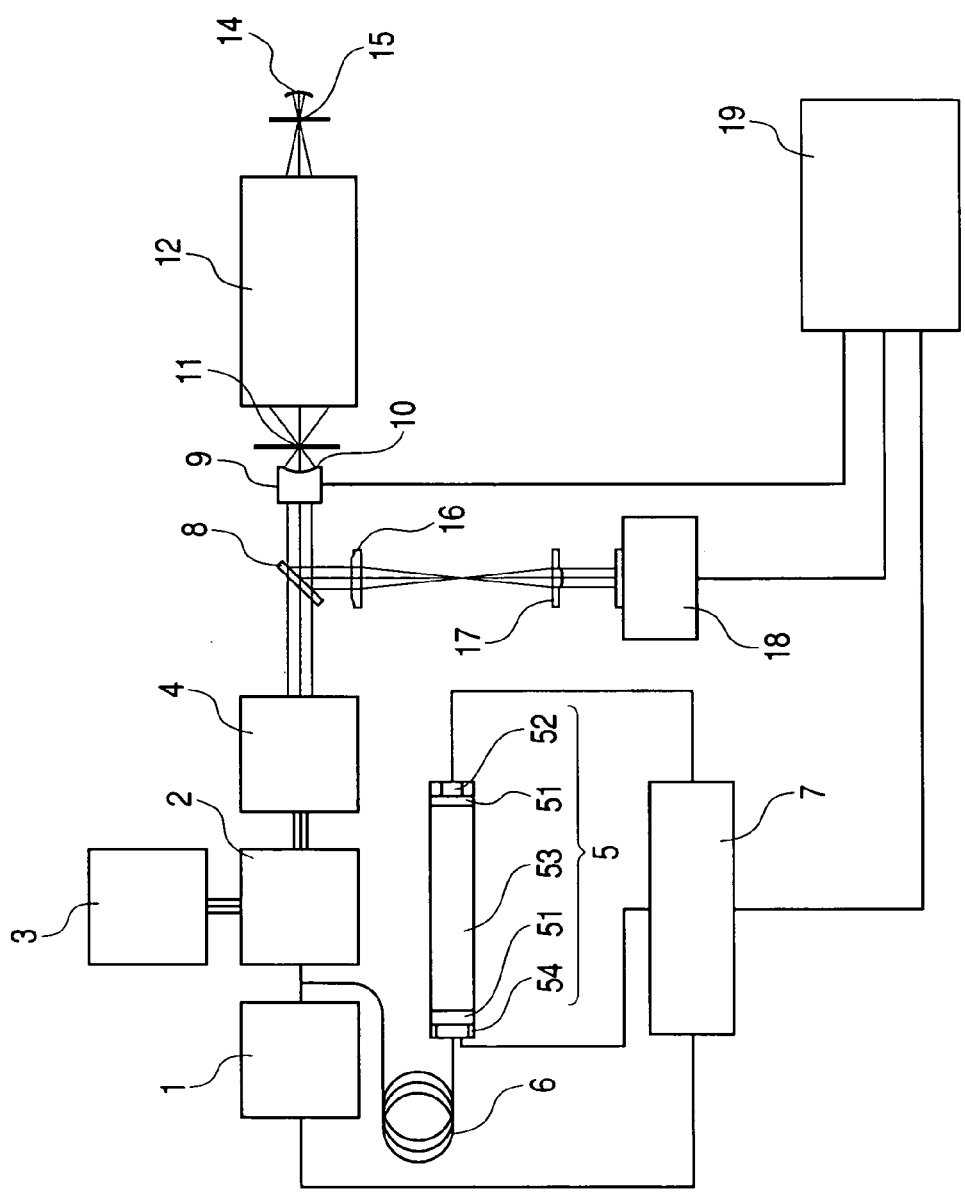
FIG. 5 is a schematic block diagram of an aberration measuring apparatus showing another embodiment of the present invention.

Here, a third embodiment will be explained with reference to FIG. 5. Here, FIG. 5 is a schematic block diagram of an aberration measuring apparatus showing another embodiment. Since it is difficult to stabilize the frequency of pulse light, frequency stabilization is performed using an implantation light source 1 which is a continuous wave light source. Since the necessary stability of the above described frequency is a value at the same wavelength as that of an optical system to be detected, when the frequency is stabilized using the implantation light source 1, the necessary stability is multiplied by (wavelength of the implantation light source/wavelength of output wavelength). For example, to finally output a light beam having a wavelength of 193 nm, it is possible to perform frequency stabilization at a level of approximately 1 MHz.

The light beam emitted from the implantation light source 1 is branched by a half mirror, etc., and guided to an external resonator 5 through a fiber 6. Of course, it is possible to use a mirror instead of the fiber 6 and route an optical path, but since the external resonator is sensitive to the incidence condition of the light beam, it is necessary to pay attention to the stability of vibration, etc., of the mirror.

The external resonator 5 is constructed of highly reflective mirrors 51 provided at both ends, a detector 52 provided on the light emitting side, a barrel 53 which holds these components and an actuator 54 for holding the highly reflective mirrors 51 on the incidence side. The barrel is made of a low expansion material such as an inverter to minimize influences of thermal expansion, etc., and placed in an environment with sufficient consideration given to disturbances such as temperature variation, vibration, etc. The external resonator 5 is a so-called etalon and the frequency resolution represented by FSR/finesse is preferably approximately 1 MHz to stabilize the above described frequency of 1 MHz. Furthermore, the actuator 54 uses a PZT, etc., allowing the control section 7 to operate the length of the resonator with high accuracy.

At the detector 52, the length of the external resonator 5 and the transmitted beam amount which varies according to the wavelength of the implantation light source 1 are converted to electrical signals and the electrical signals are connected to the control section 7.

Figure 6:
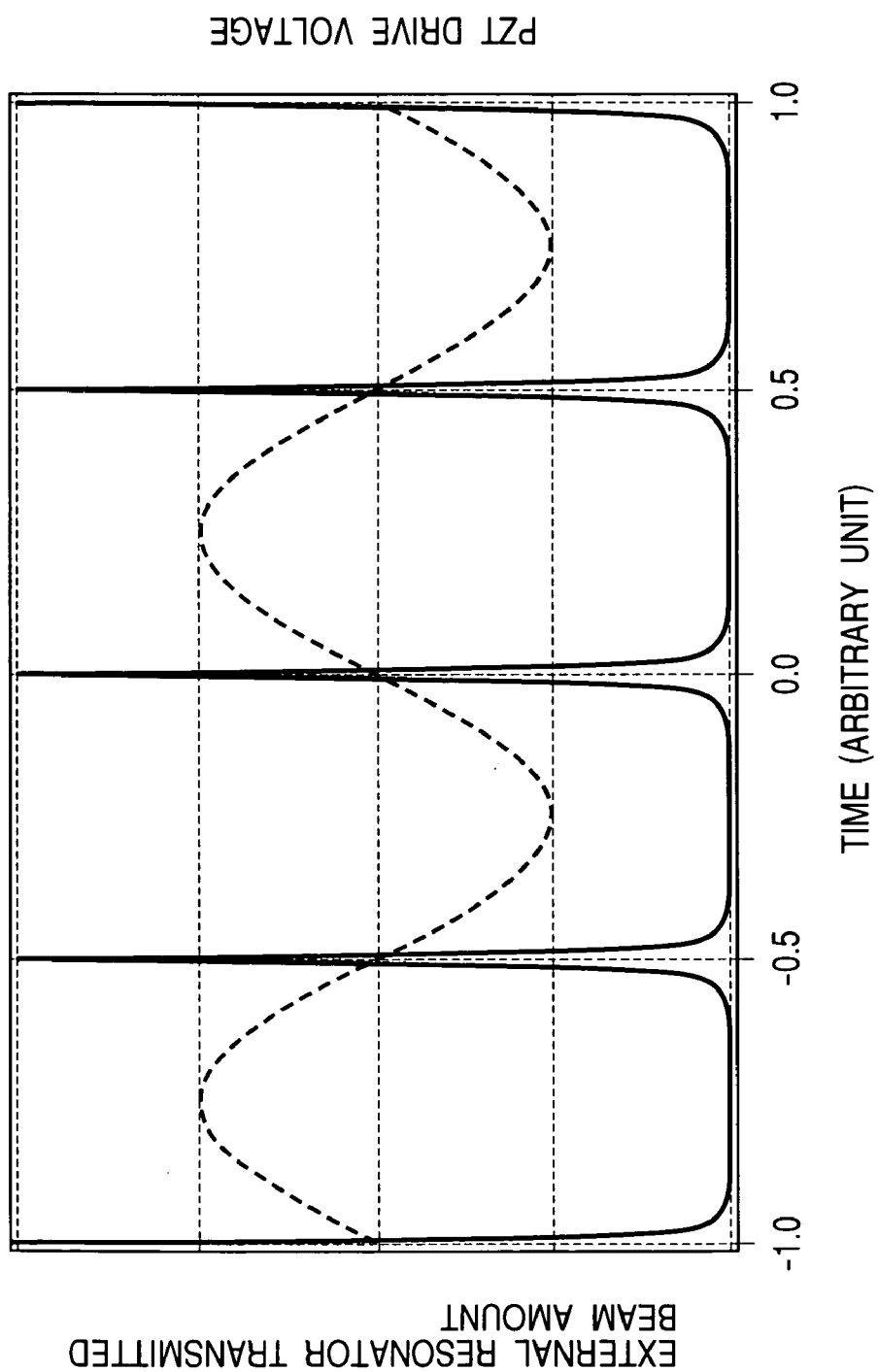
FIG. 6 is a graph showing a micro vibration of the length of an external resonator of the measuring apparatus shown in FIG. 5 and a transmitted beam amount.

The control section 7 is provided with a precise oscillator 2 for adding micro sine wave vibration to the actuator 54 and an addition circuit for adding a constant voltage offset to the output voltage of the oscillator. The constant voltage offset is set in such a way that the transmitted beam amount of the external resonator 5 becomes a maximum at the vibration center of the length of the resonator of the above described micro amount. At this time, the transmitted light output of the external resonation to which micro vibration is added is as shown in FIG. 6. Here, FIG. 6 is a graph showing a micro variation of the length of the external resonator 5 and a transmitted beam amount for carrying out frequency stabilization. A solid line shows the transmitted beam amount of the external resonator 5 and a dashed line shows the position of the actuator 54. As is well known, when a maximum value of the transmitted beam amount is at the center of vibration of the actuator 54, the spectrum of the transmitted beam amount consists of only the even-order component of the vibration frequency, but when the maximum value of the transmitted beam amount is deviated from the vibration center of the actuator 54, an odd-order component of the vibration frequency is generated. This embodiment performs frequency stabilization by controlling the frequency of the implantation light source 1 in such a way that this odd-order component reaches a minimum. To detect the odd-order component, it is possible to perform lock-in detection from the transmitted beam amount signal using the output of the oscillator 2 as a reference signal.

In this embodiment, a semiconductor laser is used as the implantation light source 1 and an implantation current for the semiconductor device which is a laser medium is changed by a feedback signal to perform frequency control. When a semiconductor laser of an external resonator type is used, it is also possible to control the frequency by driving a wavelength selection device such as a diffraction grating, etc.

When the time for frequency stabilization is long, the frequency fluctuates due to thermal drift, etc., of the oscillator 2 of the implantation light source 1 and the variation of the implantation current 1 for inputting a feedback signal increases, which affects the stability of the oscillator 2 and also provokes deterioration of accuracy of the output of the feedback signal. To avoid this influence, the control computer 19 is connected to the control section 7 and updates the amount of constant voltage offset to maximize the transmitted beam amount at the vibration center of the actuator 54 every time wavefront measurement is started.

In this way, frequency stabilization for the implantation light source 1 is made possible, and as a result, frequency stabilization at the output wavelength is realized.

A pattern scanning method is used to calculate the phase from an interference pattern measured by the camera 18. To change the length of optical path difference between the optical path to be analyzed and a reference optical path, the TS lens 9 is placed on a high precision actuator, capable of measuring images of a plurality of interference patterns with different lengths of optical path difference in synchronization with the camera 18 under the control of the control computer 19. As the method of calculating a phase from a plurality of images of interference patterns, a 13-bucket algorithm of Zygo Corporation is well known. Since the wavefront measuring accuracy is insufficient with one-time pattern scanning, the wavefront measuring accuracy is increased by carrying out pattern scanning a plurality of times.

Figure 7:
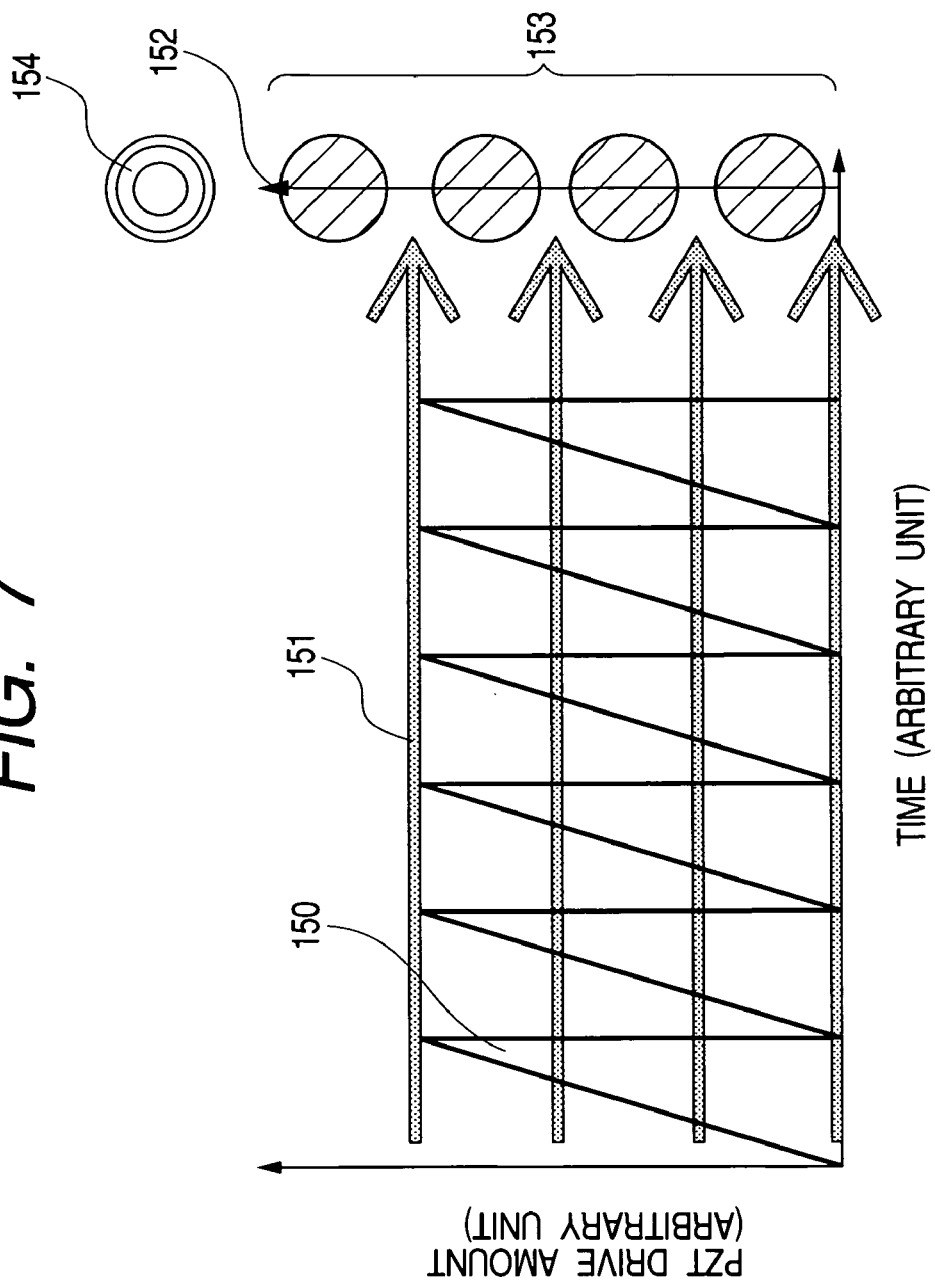
FIG. 7 is a schematic diagram showing a method of calculating the phase from a plurality of times of pattern scanning of the measuring apparatus shown in FIG. 5.

The more specific measuring method will be explained using FIG. 7. Here, FIG. 7 is a schematic view showing the method of calculating the phase from a plurality of times of pattern scanning. Solid lines 150 show the amount of drive of the actuator 154 and pattern scanning is carried out six times in FIG. 7 and a plurality of images of interference patterns corresponding in number to (the number of buckets obtained×number of times of pattern scanning) are saved in the control computer 19. After completion of a plurality of number of times of pattern scanning, interference pattern images corresponding in number to the number of times of pattern scanning of the same length of optical path difference are averaged as indicated by arrow 151. A wavefront calculation represented by arrow 152 is performed using as many averaged interference pattern images 153 as the resulting buckets. The wavefront calculation is performed through phase recovery and phase connection. In this case, a wavefront calculation needs to be carried out only once for one-time measurement, and therefore high-speed measurement is possible.

Here, the interference pattern stability for a time required for a plurality of times of pattern scanning which is required in the measuring method is guaranteed by the frequency stability for setting the time constant of an integration circuit versus a feedback signal of the control section 7 to approximately the time required for a plurality of times of pattern scanning, and therefore it is possible to realize high accuracy wavefront shape measurement.

Figure 8:
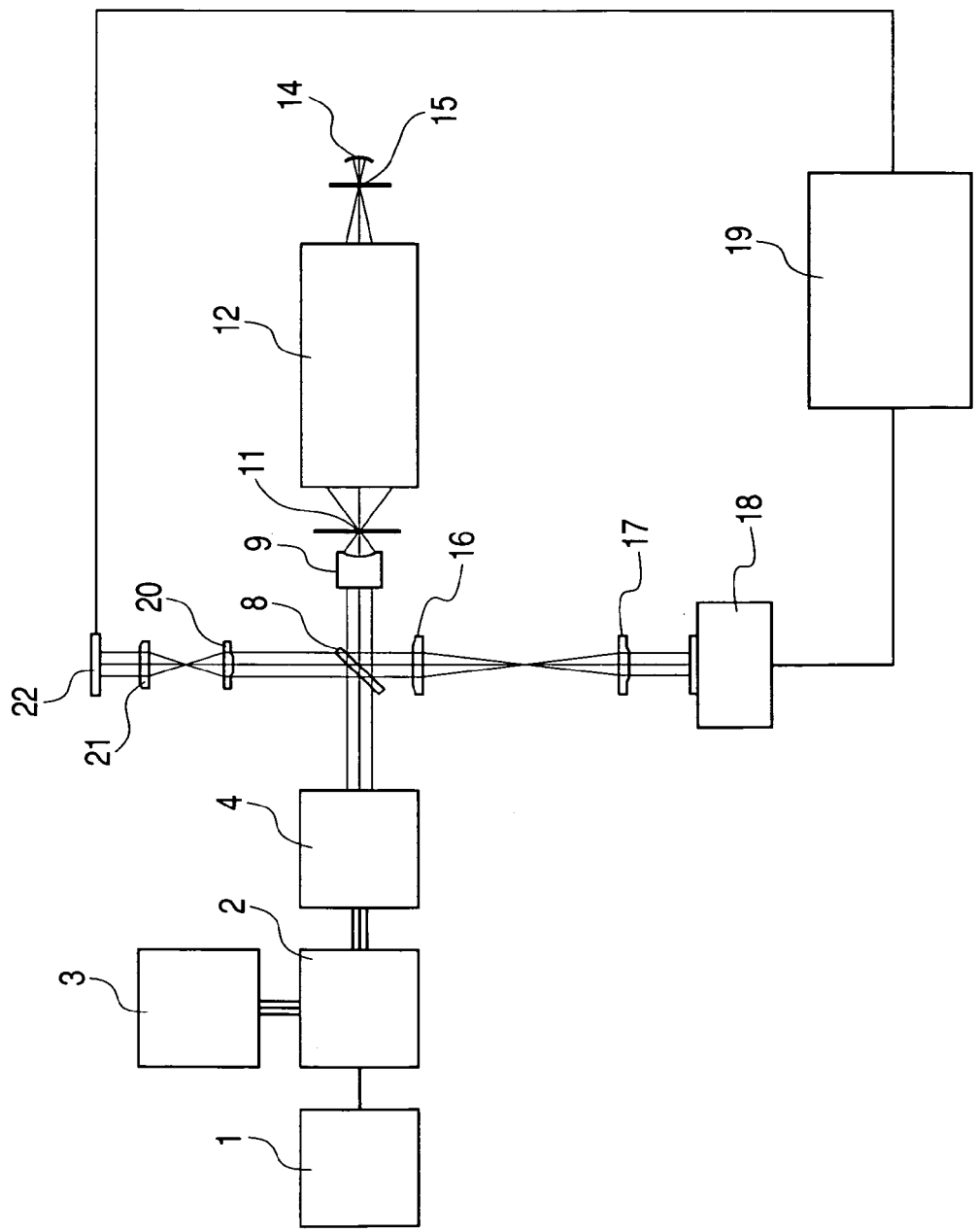
FIG. 8 is a schematic diagram of an aberration measuring apparatus according to a further embodiment of the present invention.

Here, a fourth embodiment will be explained with reference to FIG. 8. Here, FIG. 8 is a schematic block diagram of an aberration measuring apparatus showing another embodiment. As explained in first embodiment, a light beam having the same wavelength as the exposure wavelength of an optical system to be analyzed 12 is created by an implantation light source 1, an oscillator 2, an excitation light source 3 and a wavelength transformation unit 4.

Since the light beam generated from light source units 1 to 4 has a coherent length approximately 1 to 2 times the length of optical path difference, it is possible to obtain an interference pattern with sufficient contrast even when there is a length of optical path difference of approximately ½.

Since the length of optical path difference in this embodiment is approximately half the length of the optical path to be detected, the influence of the frequency stability is approximately ½ of that of first embodiment from Formula 1. However, when the number of times of pattern scanning is high, a variation in the interference pattern by a frequency variation of the light source units 1 to 4 cannot be ignored, and therefore the following wavefront calculation method will be performed.

Figure 9:
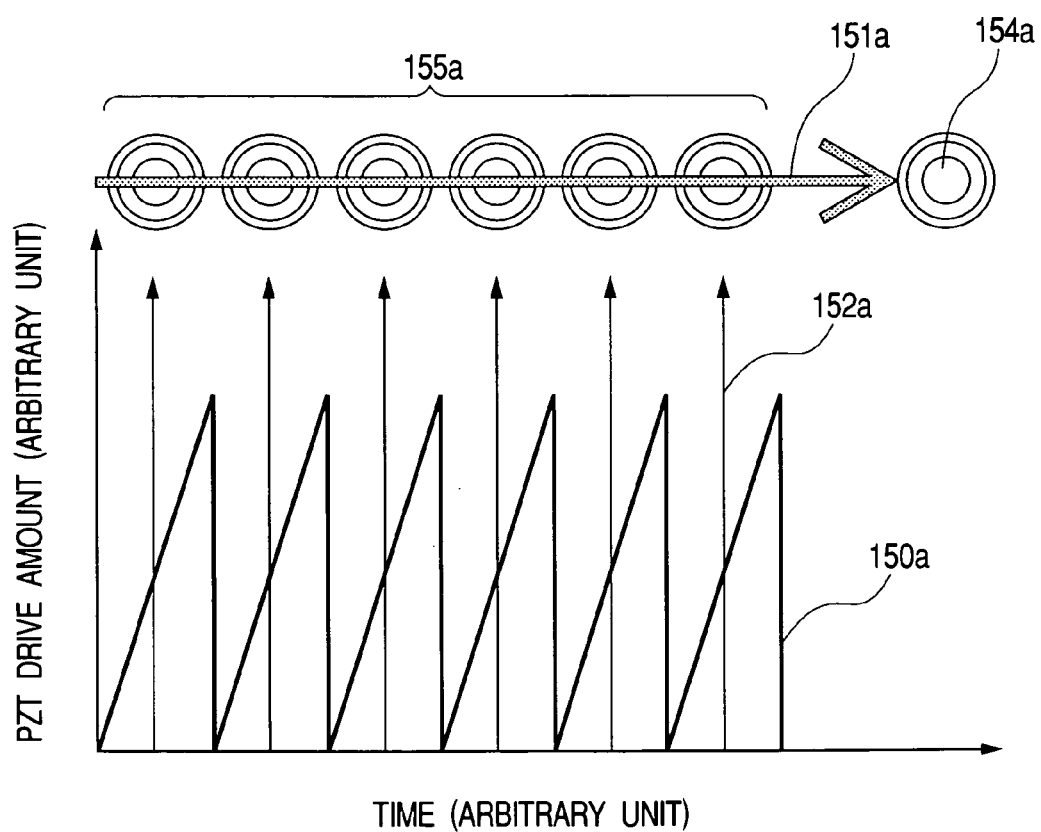
FIG. 9 is a schematic diagram showing a method of calculating the phase from a plurality of times of pattern scanning of the measuring apparatus shown in FIG. 8.

FIG. 9 is a schematic view showing the method of accurately calculating wavefronts from a plurality of times of pattern scanning in the fourth embodiment. As in the case of third embodiment, pattern scanning is performed a plurality of times and interference pattern images corresponding in number to (number of buckets × number of times of pattern scanning) are saved in a control computer 19. After completion of a plurality of number of times of pattern scanning, a wavefront calculation represented by arrow 152a is carried out for each pattern scanning and a wavefront shape 155a for each pattern scanning is obtained. In this case, the time required for pattern scanning used for each wavefront calculation is sufficiently short, and therefore influences of the interference pattern variation can be ignored. It is possible to realize high accuracy wavefront shape measurement through averaging of the wavefront shape 155a obtained in this way represented by arrow 151a.

Furthermore, when a system error is measured, measurement is performed with an RS mirror 14 placed in such a way that the center of curvature thereof matches a focus 11 of a TS lens 9. Since the length of a reference optical path is set to approximately half the length of an optical path to be analyzed, it is possible to perform wavefront measurement using an interference pattern which has contrast equivalent to the contrast when the optical system to be analyzed is measured by changing the position of the reference mirror 22 and without adjusting the length of optical path difference of the optical path to be analyzed. As a result, the wavefront of the system during system error measurement matches the wavefront of the system during measurement of the optical system to be analyzed, and therefore it is possible to realize high accuracy system removal.

Figure 10:
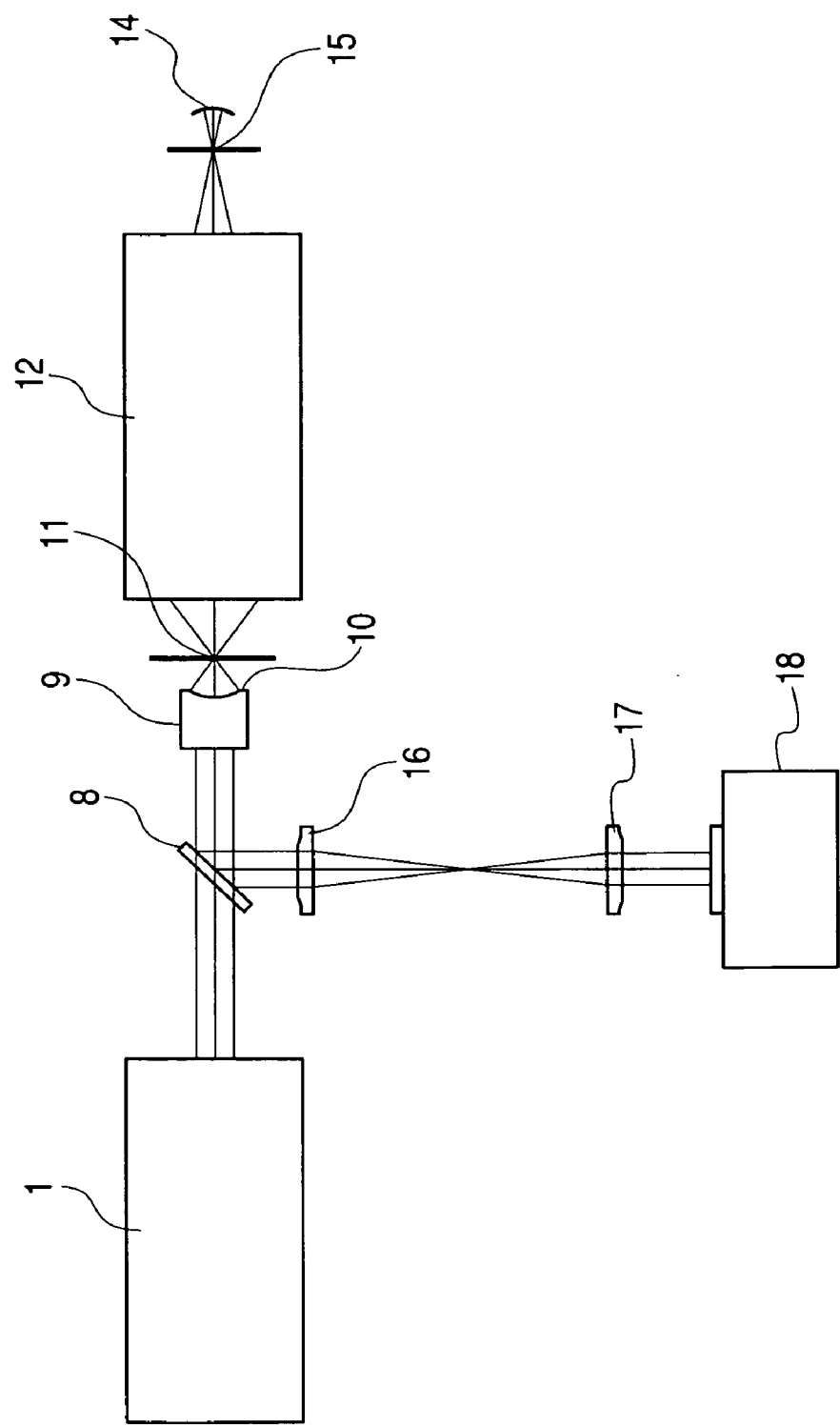
FIG. 10 is a schematic diagram of an aberration measuring apparatus according to a still further embodiment of the present invention.

Here, a fifth embodiment according to the present invention will be explained with reference to FIG. 10. Here, FIG. 10 is another embodiment of an aberration measuring apparatus. For a highly reflective RS mirror 14, one with reflective coating such as $MgF_2$ added to normal aluminum coating is used. The reflective index of this highly reflective RS mirror 14 is approximately 90%. To avoid deterioration of the plane accuracy by coating, it is possible to use the RS mirror 14 made of a silicon crystal, etc. When a silicon crystal is used, the reflective index is approximately 60% at a wavelength of 193 nm.

Here, the method of deciding the reflective index of the reflective TS plane 10 will be explained. The reflective index of the reflective TS plane 10 is decided by the condition under which the beam amount of an optical path to be detected matches the beam amount of a reference optical path. The amount of the optical path to be detected is actually affected by multiple interference produced between the reflective TS plane 10 and highly reflective RS plane, but this effect will be ignored. At this time, the reflective index of the reflective TS plane is determined using the transmittance of the optical system to be analyzed 12 and the reflective index of the RS mirror 14 from Formula 5.

$$Rts = \frac{1 + 2R_{rs}T^2 - \sqrt{1 + 4R_{rs}T^2}}{2R_{rs}T^2} \qquad \text{[Formula 5]}$$

where, RTS is the reflective index of the reflective TS plane 10, T is the transmittance of the optical system to be analyzed 12, and RRS is the reflective index of the highly reflective RS mirror 14.

Assuming the transmittance of the optical system to be analyzed 12 is 50%, the reflective index of the highly reflective RS mirror 14 is 90%, and therefore the reflective index of the reflective TS plane is 16%. A reflective film of 16% can be created from a three-layer reflective film using an oxide. Of course, it is also possible to realize a desired reflective index using a different number of films and a different amount of material. The light beam reflected by the highly reflective RS mirror 14 passes through the optical system to be analyzed 12 and TS lens 9 again, reflected by a half mirror 8, and then enters a camera 18 in the same way as the reference light beam. Hereinafter, this second light beam will be referred to as a "light beam to be analyzed."

As a result of interference between the above described reference light beam and above described light beam to be analyzed, on the camera 18 an interference pattern according to the length of optical path difference between the above described reference light beam and above described light beam to be analyzed is observed.

When a wavefront shape is measured from an interference pattern, it is possible to calculate the phase from a plurality of interference patterns when the TS lens 9 or RS mirror 14 are scanned in the direction of the optical axis as in the case of a conventional Fizeau type interferometer.

Figure 11:
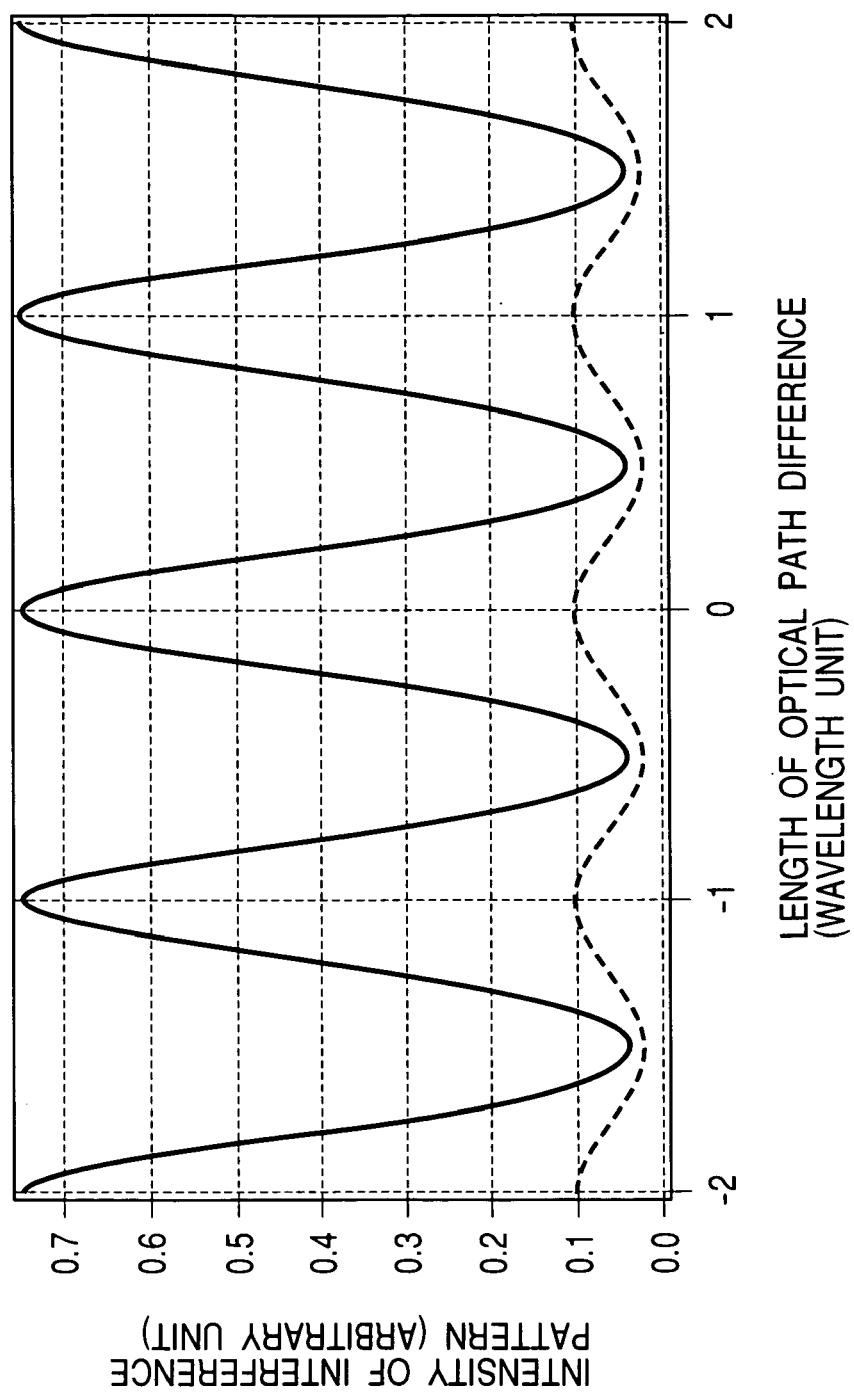
FIG. 11 is a graph showing intensity of an interference pattern of the measuring apparatus shown in FIG. 10.

FIG. 11 shows intensity of an interference pattern. A solid line shows a value of this embodiment. Intensity of an interference pattern when the conventional TS plane 10 and RS plane having a reflective index of approximately 5% are used for a comparison is shown by a dashed line. It is appreciated that the contrast of the interference pattern and intensity of the interference pattern have improved from the conventional example.

While the contrast of the interference pattern is 65% in the conventional example, that of this embodiment is 90% and measurement is made possible with a beam amount approximately ½ times the beam amount necessary for a conventional Fizeau type interferometer.

Though not described in FIG. 10, the highly reflective RS mirror 14 is provided with an actuator such as a high accuracy PZT and it is possible to measure wavefront of the optical system to be analyzed 12 from a variation in the interference pattern when the highly reflective RS mirror 14 is scanned. Furthermore, this actuator can scan not only the stroke necessary during pattern scanning but also the stroke which generates the length of optical path difference of one wavelength or more.

On the other hand, when both reflective indices of the reflective TS plane 10 and the highly reflective RS mirror 14 are high, the light beam is trapped between the two and multiple interference becomes noticeable. That is, this is a so-called etalon effect that the light beams strengthen each other where the length of optical path difference is an integer multiple of the wavelength and weaken each other in other areas. As a result, intensity modulation during pattern scanning is deviated from an ideal Sin function and this provokes an error when the above described phase is calculated. Since the coherent length of a normal single longitudinal frequency continuous wave light source is sufficiently long compared to the length of optical path difference, the phase calculation error due to the fact that this intensity modulation is deviated from the Sin function cannot be ignored, but when a pulse light source having a length of optical path difference equivalent to the coherent length is used, the coherence itself during multiple interference is low and the influence is reduced.

When the wavelength is 193 nm or less, realizing a high coherence light source itself is difficult and as a result the effect of multiple interference is small and at the same time the beam amount output from the light source is also small compared to the light source having a greater wavelength, and it is therefore particularly advantageous. Furthermore, the above described phase error is an amount only dependent on the initial phase to be calculated and the degree of deviation from the Sin function of intensity modulation. Therefore, it is possible to correct the above described phase calculation error by measuring one wavelength a plurality of times while shifting the initial position of scanning of the reflective TS lens 10 or the highly reflective RS mirror 14 and averaging the plurality of wavefront shape measurement results obtained.

Figure 12:
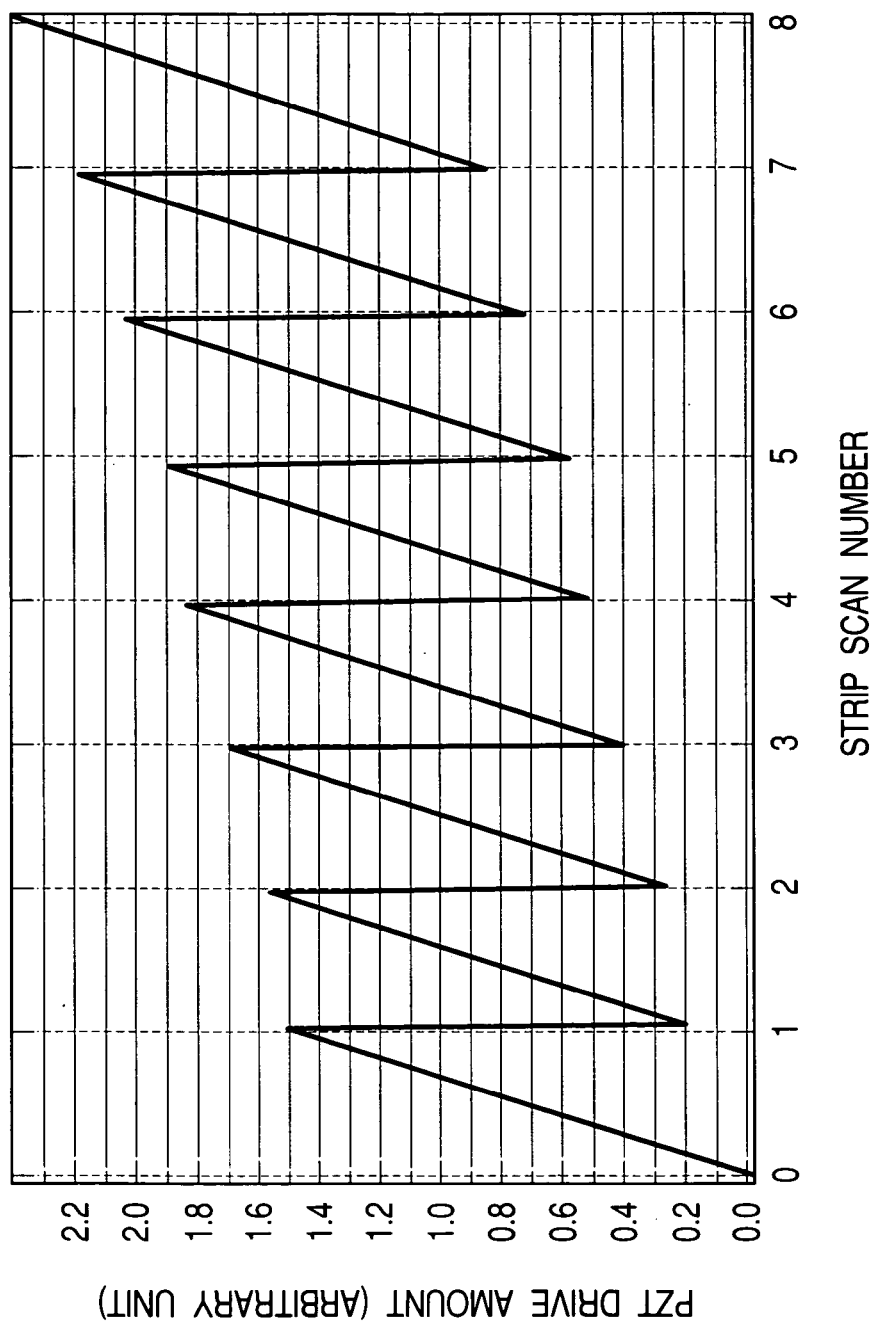
FIG. 12 is a graph showing a variation of the length of optical path difference of the measuring apparatus shown in FIG. 10.
Figure 13:
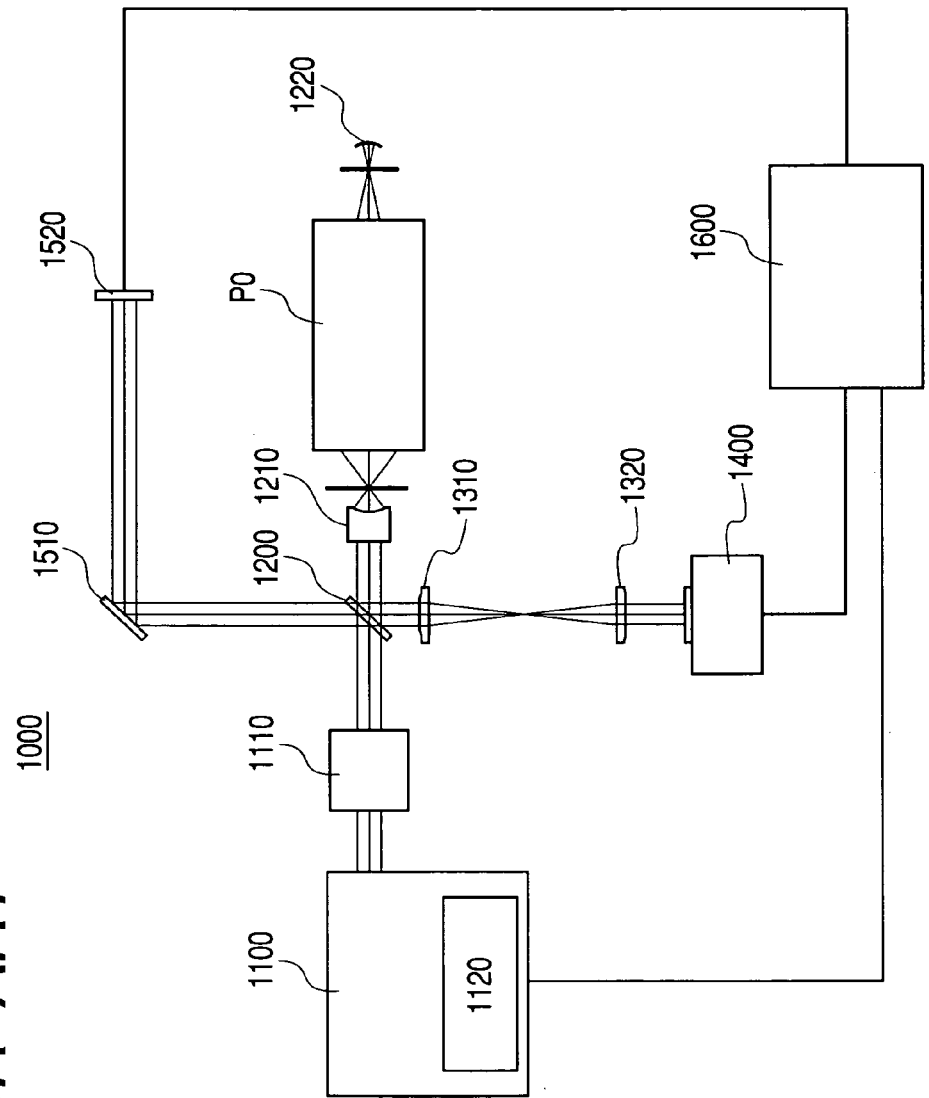
FIG. 13 is a schematic diagram showing a conventional measuring apparatus.
Figure 14:
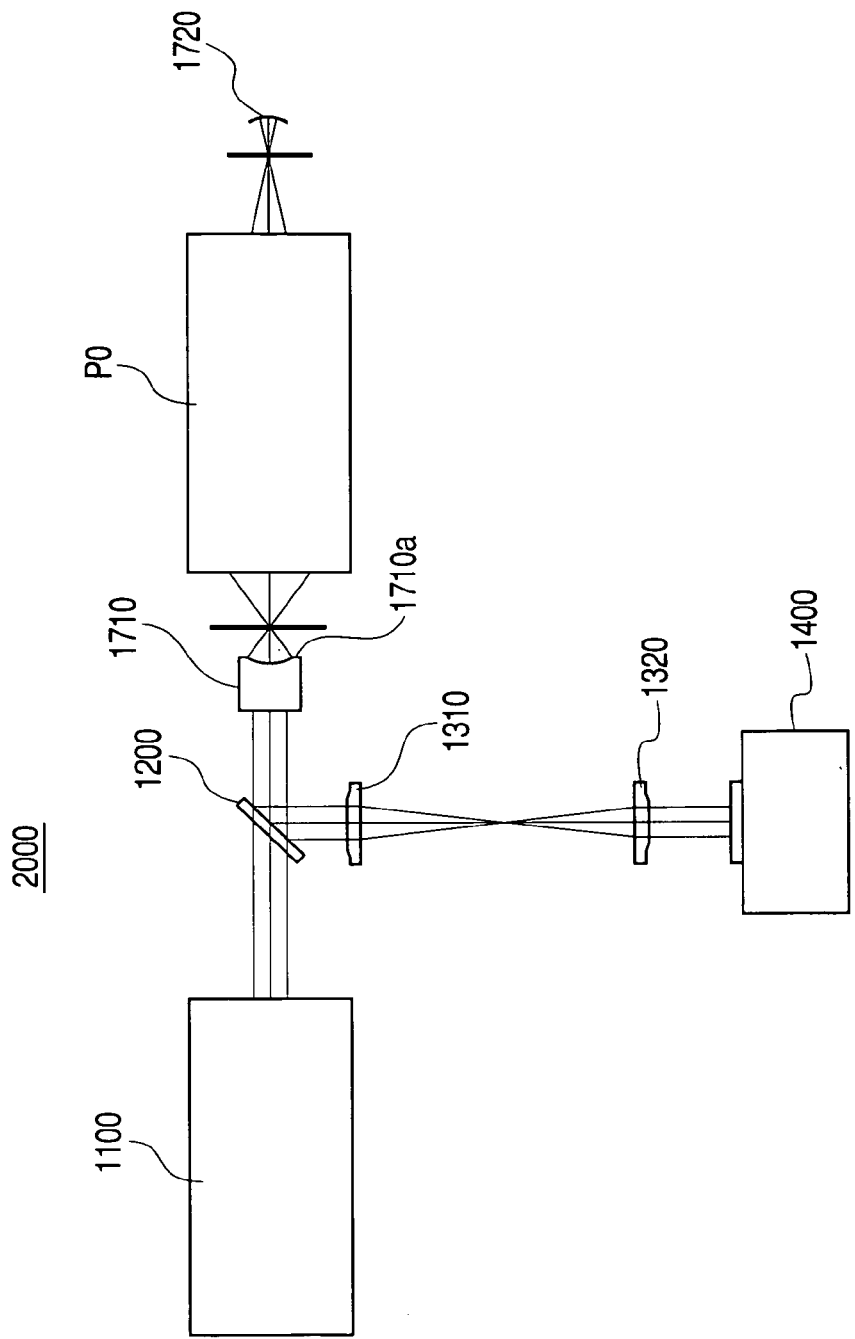
FIG. 14 is a schematic diagram showing another embodiment of the measuring apparatus shown in FIG. 13.
Figure 15:
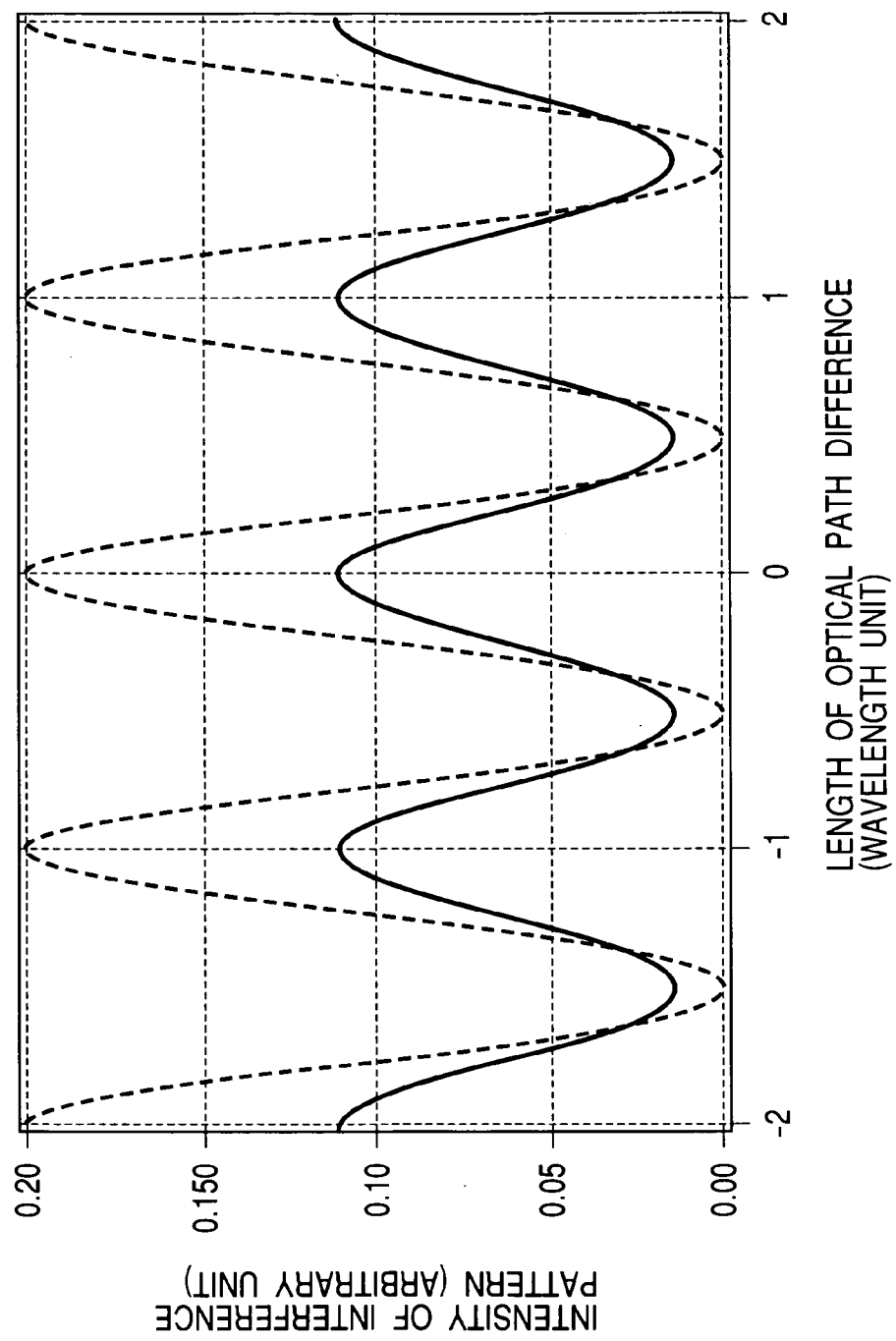
FIG. 15 is a graph showing intensity of the interference pattern of the measuring apparatus shown in FIG. 13.

FIG. 12 shows PZT drive for pattern scanning in this embodiment for carrying out the above described correction. A total of eight times of PZT scanning which is equivalent to the length of optical path difference of a ⅜ wavelength are carried out and the initial position is shifted by ⅛ wavelength with respect to the length of optical path difference for each scanning. By calculating phases from the respective scanning results and averaging the respective phase calculations results, it is possible to correct the above described phase calculation error.

Figure 16:
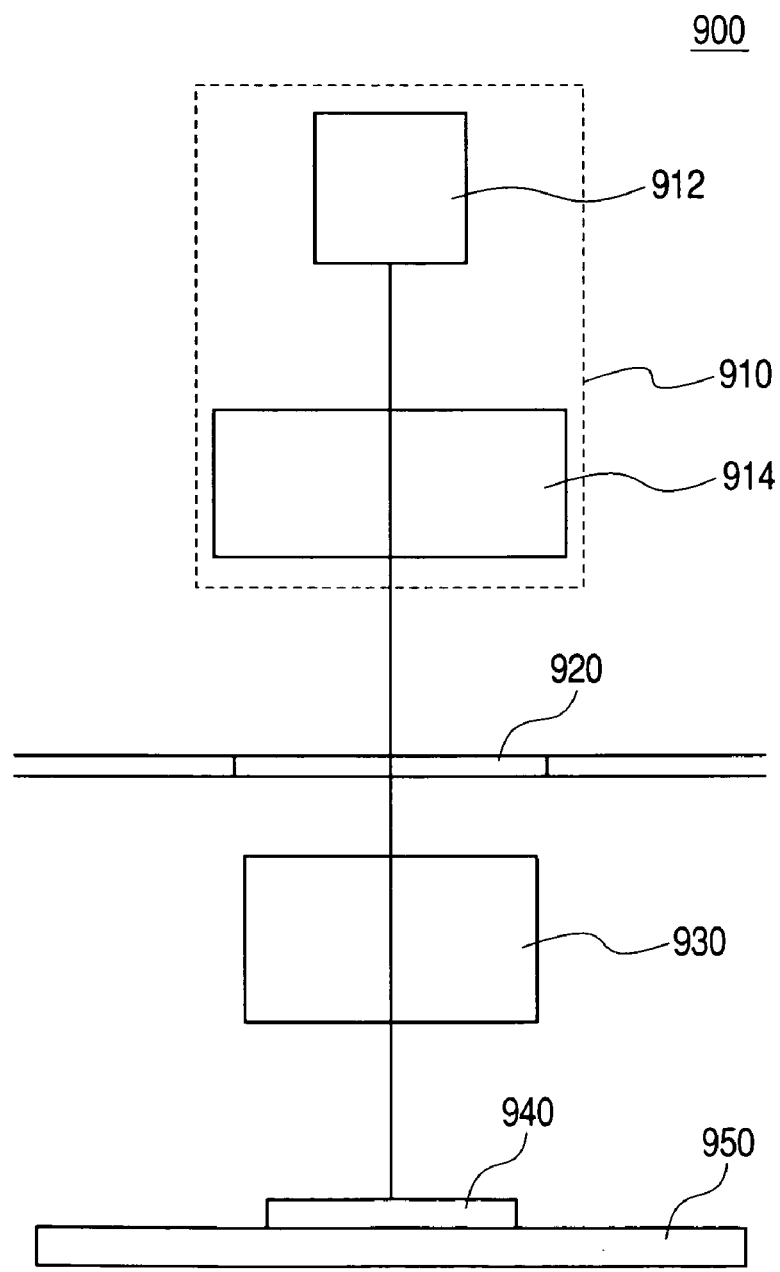
FIG. 16 is a schematic block diagram of a photolithography apparatus as one aspect of the present invention.

With reference to FIG. 16, an exemplary photolithography apparatus 900 of the present invention will be explained. Here, FIG. 16 is a schematic block diagram of the photolithography apparatus 900. As shown in FIG. 16, the photolithography apparatus 900 is provided with an illumination apparatus 910 which illuminates a mask or reticule 920 on which a circuit pattern is formed (these are used as mutually interchangeable terms in the present application), a stage 950 which holds a plate and a projection optical system 930 which projects an illuminated circuit pattern onto a plate 940.

The photolithography apparatus 900 is a projection photolithography apparatus which projects a circuit pattern formed on the mask 920 according to, for example, a step-and-repeat system and step-and-scan system onto the plate 940. Such a photolithography apparatus is preferably applicable to a lithography step on the order of submicron or quarter micron or smaller and this embodiment will be explained below using a step-and-scan system photolithography apparatus (also called "scanner") as an example below. Here, the "step-and-scan system" is an exposure method which scans a wafer continuously through a mask, projects a mask pattern onto the wafer through exposure to light, moves the wafer one step after every one shot of exposure and then moves to an exposure area for the next shot. The "step-and-repeat system" is an exposure method which moves a wafer one step after a batch of shots of exposure and then moves the next shot to an exposure area.

The illumination apparatus 910 illuminates the mask 920 on which a circuit pattern to be transferred is formed and includes a light source section 912 and an illumination optical system 914.

The light source section 912 uses, for example, a laser as the light source. For the laser, it is possible to use an ArF excimer laser having a wavelength of approximately 193 nm, a KrF excimer laser having a wavelength of approximately 248 nm or an $F_2$ laser having a wavelength of approximately 153 nm, etc. However, the type of laser is not limited to excimer laser and for example, a YAG laser may be used and the number of lasers is not limited either. For example, if two solid lasers which operate independently of each other are used, there is no mutual coherence between the solid lasers and speckles caused by the coherence are reduced considerably. Furthermore, to further reduce speckles, the optical system may also be shaken linearly or circularly. Furthermore, when a laser is used for the light source 912, it is preferable to use a light beam shaping optical system which shapes a parallel beam from a laser light source to a desired beam shape and an incoherent conversion optical system which converts a coherent laser beam to an incoherent beam. Furthermore, the light source usable for the light source section 912 is not limited to a laser, but one or a plurality of lamps such as mercury lamps or xenon lamps can also be used.

The illumination optical system 914 is an optical system which illuminates the mask 920 and includes a lens, mirror, light, integrator, stop, etc. For example, it consists of a condenser lens, a fly's eye lens, an aperture stop, a condenser lens, a slit and an image formation optical system arranged in that order. The illumination optical system 914 can be used for light on the optical axis and light out of the optical axis alike. The light integrator includes an integrator, etc., which has a laminated structure of a fly's eye lens and two sets of cylindrical lens array (or lenticule lens) boards or may also be replaced by an optical rod or diffraction device. An optical device measured using the aberration measuring apparatus of the present invention can be used for optical devices of this illumination optical system 914.

The mask 920 is made of, for example, quartz and a circuit pattern (or image) to be transferred is formed thereupon and supported or driven by a mask stage (not shown). Diffracted light emitted from the mask 920 is projected onto the plate 940 through the projection optical system 930. The plate 940 is an object to be processed such as a wafer or liquid crystal substrate and a resist is applied thereto. The mask 920 and the plate 940 are in a relationship conjugate with each other. In the case of a scanner, by scanning the mask 920 and plate 940, a pattern of the mask 920 is transferred to the plate 940. In the case of a stepper, exposure is carried out with the mask 920 and plate 940 left standing still.

For the projection optical system 930, it is possible to use an optical system made of a plurality of lens elements, an optical system consisting of a plurality of lens elements and at least one concave mirror (catadioptric optical system), an optical system consisting of a plurality of lens elements and at least one diffraction optical device such as kinoform or a total mirror type optical system. When chromatic aberration needs to be corrected, a plurality of lens elements made of glass materials with different variances values (Abbe values) are used or the diffraction optical devices are made up so as to generate variances of the way opposite to the lens elements. An optical device measured using the aberration measuring apparatus of the present invention can be used for optical devices such as the lens of this projection optical system 930.

A photoresist is applied to the plate 940. The photoresist application step includes upstream processing, adherence improver application processing, photoresist application processing and prebake processing. The upstream processing includes cleaning and drying, etc. The adherence improver application processing is processing of surface reforming (that is, hydrophobic transformation through application of a surface-active agent) to increase adherence between the photoresist and base, and applies coating or vapor processing with an organic film such as HMDS (Hexamethyl-disilazane), etc. Prebake is baking processing, but it is softer than that after development and removes a solvent.

The stage 950 holds the plate 940. For the stage 950, any structure known in the industry can be used, and therefore explanations of details of its structure and operation will be omitted here. For example, the stage 950 can move the plate 940 in the XY direction using a linear motor. The mask 920 and plate 940 are scanned synchronously and the positions of the stage 950 and mask stage (not shown) are monitored using a laser interferometer, etc., and both are driven at a certain speed ratio. The stage 950 is provided on a stage surface plate supported on a floor, etc., through a damper and the mask stage and projection optical system 930 are provided on a barrel surface plate (not shown) supported on a base frame placed on the floor, etc., through a damper.

During exposure to light, the light beam emitted from the light source section 912 illuminates the mask 920 based on Köhler's illumination through the illumination optical system. An image of the light which passes through the mask 920 and reflects the mask pattern is formed on the plate 940 through the projection optical system 930. The illumination optical system 914 and projection optical system 930 include optical devices such as lenses of the illumination optical system 914 according to the present invention measured using the aberration measuring apparatus of the present invention, cause UV light, far-infrared light and vacuum UV light to pass at high transmittance, and can thereby provide devices (semiconductor device, LCD device, image-pickup device (CCD, etc.), thin film magnetic head, etc.) with high throughput and high cost efficiency.

Figure 17:
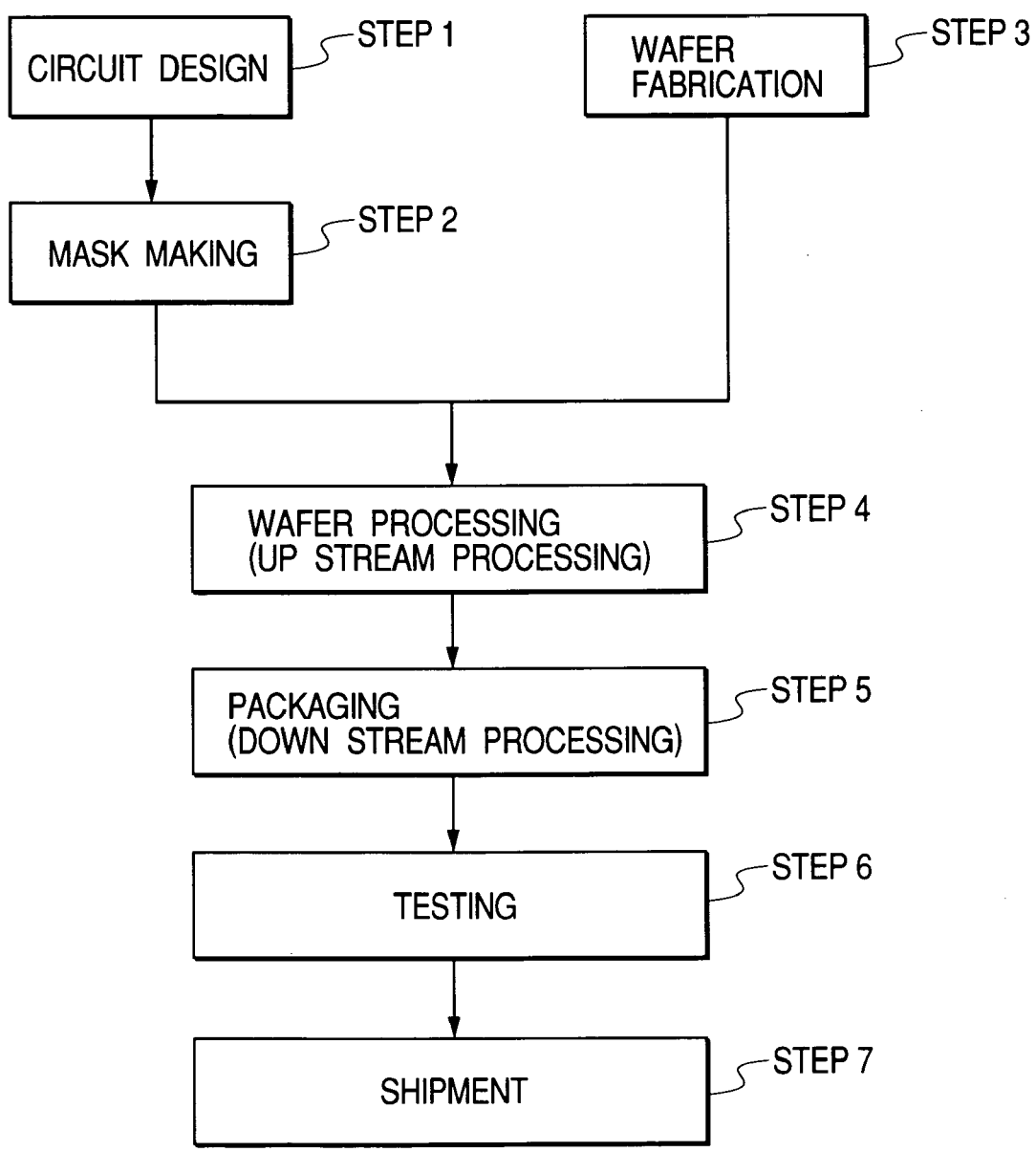
FIG. 17 is a flow chart illustrating a method of manufacturing a device having the photolithography apparatus of the present invention.

Then, with reference to FIG. 17 and FIG. 18, an embodiment of the device manufacturing method using the above described photolithography apparatus 900 will be explained. FIG. 17 is a flow chart illustrating manufacturing of a device (semiconductor chip such as IC and LSI, LCD and CCD, etc.). In this embodiment, manufacturing of a semiconductor chip will be explained as an example. In step 1 (circuit design), circuit design of the device will be conducted. In step 2 (mask making), a mask on which a designed circuit pattern is formed will be created. In step 3 (wafer fabrication), a wafer will be created using a material such as silicon. In step 4 (wafer processing) which is called "upstream processing", an actual circuit will be formed on the wafer using the mask and wafer according to a lithography technology. Step 5 (packaging) is called "downstream processing" and is a step of creating a semiconductor chip using the wafer created in step 4 and it includes an assembly step (dicing, bonding), packaging step (chip inclusion), etc. In step 6 (testing), testing such as an operation check test and durability test, etc., are conducted on the semiconductor device created in step 5. Through these steps, a semiconductor device is completed and shipped (step 7).

Figure 18:
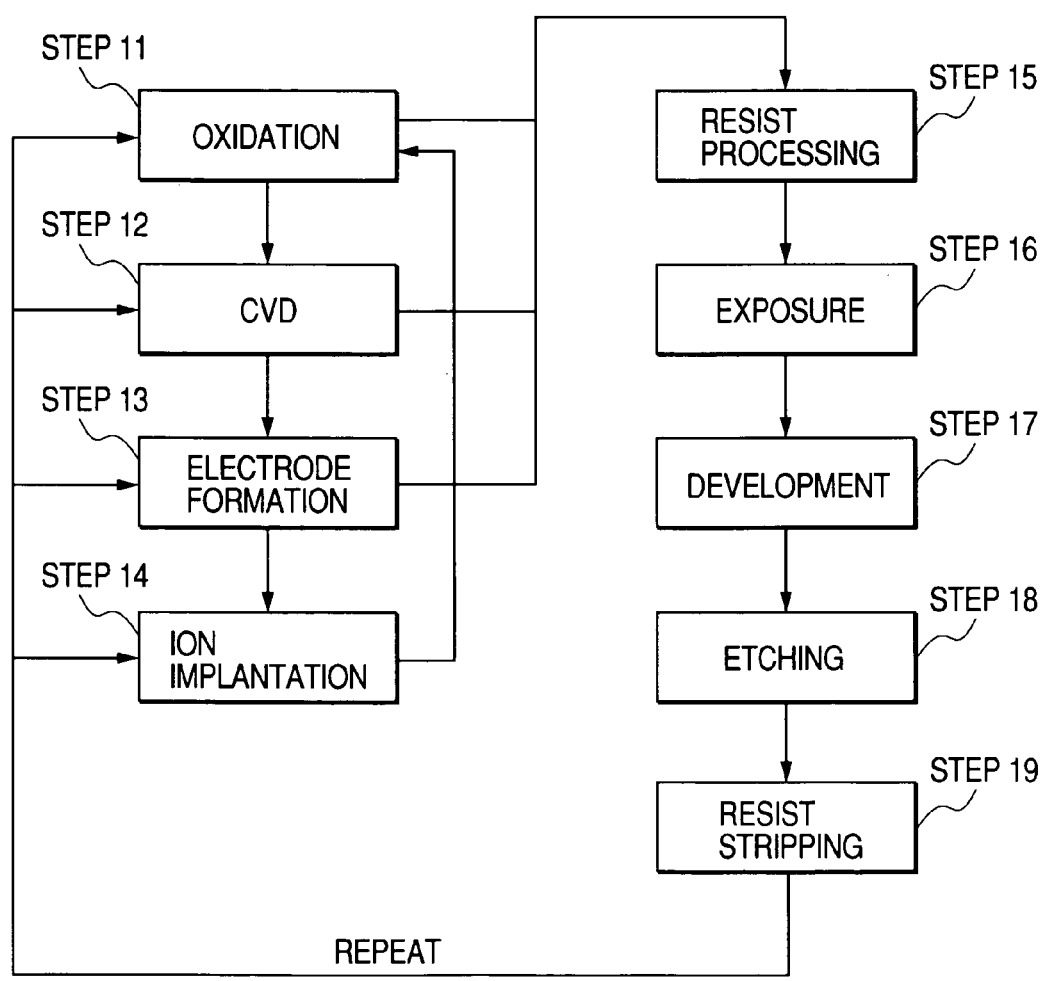
FIG. 18 is a flow chart showing details of step 4 shown in FIG. 17.

FIG. 18 is a detailed flow chart of the wafer processing in step 4. In step 11 (oxidation), the surface of the wafer is oxidized. In step 12 (CVD), an insulating film is formed on the surface of the wafer. In step 13 (electrode formation), electrodes are formed on the wafer by means of vapor deposition, etc. In step 14 (ion implantation), ions are implanted in the wafer. In step 15 (resist processing), a photosensitizer is applied to the wafer. In step 16 (exposure), a mask circuit pattern is projected onto the wafer through exposure to light using the photolithography apparatus 900. In step 17 (development), the wafer exposed to light is. developed. In step 18 (etching), parts other than the developed resist image are erased. In step 19 (resist stripping), the resist which becomes unnecessary after etching is removed. Repeating these steps, multiple layers of circuit patterns are formed on the wafer. According to the manufacturing method in this embodiment, it is possible to manufacture a higher definition device than in the conventional art.

The preferred embodiments of the present invention have been explained so far, but the present invention is not limited to these embodiments and can be modified and changed in various ways within the range of the essence thereof.

What is claimed is:

1. An aberration measuring apparatus which measures aberration of an optical system to be analyzed using light having substantially the same wavelength as the wavelength used in said optical system to be analyzed, comprising:

a light source which emits light having a near-infrared wavelength;

a wavelength transformer which transforms light from the light source to light having substantially the same wavelength as the wavelength used;

an interferometer which causes the light from said wavelength transformer to enter the optical system to be analyzed and measures aberration of said optical system to be analyzed; and a wavelength calibrating means for calibrating the wavelength of the light from said light source, wherein said wavelength calibrating means further comprises phase modulating means and carries out wavelength calibration of said light using a band wave generated by carrying out phase modulation on the light having the wavelength subject to said wavelength calibration.

2. A photolithography apparatus which projects a pattern on a mask onto an object to be exposed to light using an optical system to be analyzed whose wavefront aberration is measured using the aberration measuring apparatus according to claim 1.

3. A method of manufacturing a device comprising:

a step of exposing to light an object to be exposed using the photolithography apparatus according to claim 2; and a step of developing said object to be exposed.

4. A photolithography apparatus comprising:

the aberration measuring apparatus according to claim 1; and a projection optical system which projects a pattern on a mask onto an object to be exposed, wherein said aberration measuring apparatus can measure wavefront aberration of said projection optical system.

* * * * *